(12) United States Patent
Kim et al.

(10) Patent No.: US 12,348,494 B2
(45) Date of Patent: Jul. 1, 2025

(54) NETWORK ACCESS CONTROL SYSTEM AND METHOD THEREFOR

(71) Applicant: PRIBIT Technology, Inc., Seoul (KR)

(72) Inventors: Young Rang Kim, Seoul (KR); Min Jae Lee, Seoul (KR); Pil Ho Song, Seoul (KR); Joo Tae Kim, Seoul (KR)

(73) Assignee: PRIBIT Technology, Inc., Seoul (KR)

( * ) Notice: Subject to any disclaimer, the term of this patent is extended or adjusted under 35 U.S.C. 154(b) by 256 days.

(21) Appl. No.: 17/656,080

(22) PCT Filed: Sep. 24, 2020

(86) PCT No.: PCT/KR2020/012924
§ 371 (c)(1),
(2) Date: Mar. 23, 2022

(87) PCT Pub. No.: WO2021/060854
PCT Pub. Date: Apr. 1, 2021

(65) Prior Publication Data
US 2022/0247719 A1  Aug. 4, 2022

Related U.S. Application Data

(63) Continuation-in-part of application No. 16/580,974, filed on Sep. 24, 2019, now Pat. No. 11,381,557.
(Continued)

(30) Foreign Application Priority Data

Apr. 14, 2020  (KR) .................. 10-2020-0045526

(51) Int. Cl.
*H04L 9/40* (2022.01)
*H04L 12/46* (2006.01)
*H04L 69/166* (2022.01)

(52) U.S. Cl.
CPC ........ *H04L 63/029* (2013.01); *H04L 12/4633* (2013.01); *H04L 69/166* (2013.01)

(58) Field of Classification Search
CPC . H04L 63/029; H04L 12/4633; H04L 69/166; H04L 63/108; H04L 63/0209;
(Continued)

(56) References Cited

U.S. PATENT DOCUMENTS 5,995,623 A * 11/1999 Kawano ................. G06F 21/10
380/42
6,076,168 A * 6/2000 Fiveash ............... H04L 63/0263
713/154

(Continued)

FOREIGN PATENT DOCUMENTS

CN   104284385 A   1/2015
CN   105471748 A   4/2016
(Continued)

OTHER PUBLICATIONS

Extended European Search Report dated Oct. 28, 2022 for European Pat. App. No. 20868832.5.
(Continued)

*Primary Examiner* — Aravind K Moorthy
(74) *Attorney, Agent, or Firm* — Seed IP Law Group LLP

(57) ABSTRACT

A network access control device generates, in a tunnel-based access control network environment, a tunnel that connects a terminal application to the gateway of a destination network, on the basis of a tunnel between the terminal application and a gateway and a tunnel between gateways, thereby enabling safe transmission of a data packet from the terminal application to a destination node. It can include: a memory for storing a tunnel policy, a tunnel routing policy, and a tunnel table; and a control unit which generates tunnel information and data flow information on the basis of the
(Continued)

tunnel policy, the tunnel routing policy, and the tunnel table according to a network access request of the terminal, and which transmits the generated tunnel information and data flow information to the terminal and the gateway of each network so that a tunnel between the terminal and the destination network is generated.

15 Claims, 18 Drawing Sheets

Related U.S. Application Data which is a continuation-in-part of application No. 16/580,866, filed on Sep. 24, 2019, now Pat. No. 11,190,494.

(58) Field of Classification Search
CPC . H04L 63/0272; H04L 63/0428; H04L 63/08; H04L 63/101; H04L 47/2475
See application file for complete search history.

(56) References Cited

U.S. PATENT DOCUMENTS

| | | | |
|---|---|---|---|
| 6,738,909 B1* | 5/2004 | Cheng | H04L 63/12 726/3 |
| 6,963,982 B1* | 11/2005 | Brustoloni | H04L 61/2564 713/160 |
| 7,139,276 B1* | 11/2006 | Sitaraman | H04L 47/125 718/105 |
| 7,215,667 B1* | 5/2007 | Davis | H04L 63/061 370/464 |
| 7,302,496 B1* | 11/2007 | Metzger | H04L 61/2546 370/236 |
| 7,318,234 B1 | 1/2008 | Dharmarajan | |
| 7,346,770 B2* | 3/2008 | Swander | H04L 63/0464 713/153 |
| 7,359,983 B1* | 4/2008 | Maufer | H04L 61/2585 726/13 |
| 7,606,902 B2 | 10/2009 | Rao et al. | |
| 7,760,636 B1* | 7/2010 | Cheriton | H04L 47/10 370/235 |
| 7,920,701 B1* | 4/2011 | Cox | H04N 21/42646 380/201 |
| 7,978,714 B2 | 7/2011 | Rao et al. | |
| 8,000,327 B1* | 8/2011 | Minei | H04L 45/306 370/392 |
| 8,019,868 B2 | 9/2011 | Rao et al. | |
| 8,024,488 B2 | 9/2011 | Salowey et al. | |
| 8,289,968 B1* | 10/2012 | Zhuang | H04L 61/2532 370/252 |
| 8,291,119 B2 | 10/2012 | Rao et al. | |
| 8,363,650 B2 | 1/2013 | Rao et al. | |
| 8,385,199 B1* | 2/2013 | Coward | H04L 47/22 370/230.1 |
| 8,612,612 B1* | 12/2013 | Dukes | H04L 67/141 709/203 |
| 8,843,998 B2 | 9/2014 | Fu et al. | |
| 8,892,778 B2 | 11/2014 | Rao et al. | |
| 8,897,299 B2 | 11/2014 | Rao et al. | |
| 8,923,853 B1* | 12/2014 | Shaw | H04W 8/12 455/433 |
| 9,088,564 B1 | 7/2015 | Hobson et al. | |
| 9,106,538 B1 | 8/2015 | Asnis | |
| 9,143,481 B2 | 9/2015 | Wood | |
| 9,143,942 B2 | 9/2015 | Agarwal et al. | |
| 9,148,408 B1 | 9/2015 | Glazemakers | |
| 9,240,938 B2 | 1/2016 | Dimond et al. | |
| 9,252,972 B1* | 2/2016 | Dukes | H04L 49/70 |
| 9,356,866 B1* | 5/2016 | Sivaramakrishnan | H04L 45/50 |
| 9,402,002 B1* | 7/2016 | Hao | H04M 15/8214 |
| 9,578,052 B2 | 2/2017 | Cp et al. | |
| 9,715,597 B2 | 7/2017 | Smith et al. | |
| 9,860,208 B1 | 1/2018 | Ettema et al. | |
| 9,912,673 B2 | 3/2018 | Evenden et al. | |
| 9,984,230 B2 | 5/2018 | Pikhur et al. | |
| 10,033,766 B2 | 7/2018 | Gupta et al. | |
| 10,129,207 B1* | 11/2018 | Wan | H04L 61/2514 |
| 10,162,767 B2 | 12/2018 | Spurlock et al. | |
| 10,176,344 B2 | 1/2019 | Smith et al. | |
| 10,205,743 B2 | 2/2019 | Cp et al. | |
| 10,243,833 B2 | 3/2019 | Tang et al. | |
| 10,326,672 B2 | 6/2019 | Scheib et al. | |
| 10,339,303 B2 | 7/2019 | Mehta et al. | |
| 10,402,577 B2 | 9/2019 | Knapp et al. | |
| 10,484,334 B1 | 11/2019 | Lee et al. | |
| 10,659,434 B1 | 5/2020 | Kim et al. | |
| 10,659,462 B1 | 5/2020 | Kim et al. | |
| 10,764,249 B1* | 9/2020 | Kommula | H04L 12/4633 |
| 10,785,111 B2 | 9/2020 | Hill et al. | |
| 10,812,576 B1* | 10/2020 | Yuan | H04L 49/355 |
| 10,903,990 B1* | 1/2021 | Ladd | H04L 9/0825 |
| 11,271,777 B2* | 3/2022 | Kim | H04L 12/4666 |
| 11,379,611 B1* | 7/2022 | Horesh | H04L 9/008 |
| 2001/0039576 A1* | 11/2001 | Kanada | H04L 41/0894 709/244 |
| 2002/0010800 A1 | 1/2002 | Riley et al. | |
| 2002/0049899 A1 | 4/2002 | Kenworthy | |
| 2002/0161905 A1* | 10/2002 | Haverinen | H04L 63/20 709/229 |
| 2002/0163920 A1 | 11/2002 | Walker et al. | |
| 2003/0041172 A1* | 2/2003 | Calvignac | H04L 9/40 709/246 |
| 2003/0055978 A1* | 3/2003 | Collins | H04L 67/14 709/227 |
| 2003/0106067 A1* | 6/2003 | Hoskins | H04L 69/167 725/111 |
| 2003/0123481 A1* | 7/2003 | Neale | H04L 47/323 370/466 |
| 2003/0131263 A1* | 7/2003 | Keane | H04L 61/00 713/153 |
| 2003/0142823 A1* | 7/2003 | Swander | H04L 69/16 380/277 |
| 2003/0188192 A1* | 10/2003 | Tang | H04L 63/0263 726/13 |
| 2003/0212900 A1* | 11/2003 | Liu | H04L 63/0263 726/13 |
| 2004/0081150 A1* | 4/2004 | Chiang | H04L 61/2503 370/392 |
| 2004/0088385 A1* | 5/2004 | Blanchet | H04L 61/251 709/220 |
| 2004/0136534 A1* | 7/2004 | Stiscia | H04L 63/0428 380/256 |
| 2004/0139339 A1* | 7/2004 | Yeh | G06F 21/62 713/193 |
| 2004/0190449 A1* | 9/2004 | Mannal | H04L 47/12 370/229 |
| 2004/0215819 A1* | 10/2004 | Tsuruoka | H04L 49/25 709/238 |
| 2005/0060328 A1 | 3/2005 | Suhonen et al. | |
| 2005/0111399 A1 | 5/2005 | Sapienza et al. | |
| 2005/0273609 A1* | 12/2005 | Eronen | H04L 63/0428 713/171 |
| 2005/0273853 A1 | 12/2005 | Oba et al. | |
| 2005/0283604 A1* | 12/2005 | Deshpande | H04L 63/0272 713/160 |
| 2006/0018291 A1* | 1/2006 | Patel | H04L 63/0892 370/335 |
| 2006/0029062 A1 | 2/2006 | Rao et al. | |
| 2006/0029063 A1 | 2/2006 | Rao et al. | |
| 2006/0029064 A1 | 2/2006 | Rao et al. | |
| 2006/0037071 A1 | 2/2006 | Rao et al. | |
| 2006/0153067 A1* | 7/2006 | Vasseur | H04L 45/03 370/242 |
| 2006/0159029 A1 | 7/2006 | Samuels et al. | |
| 2006/0182111 A1* | 8/2006 | Wahl | H04L 65/1101 370/392 |
| 2006/0190720 A1* | 8/2006 | Ozaki | H04L 63/0428 713/160 |

(56) References Cited

U.S. PATENT DOCUMENTS

| | | | |
|---|---|---|---|
| 2006/0215684 A1* | 9/2006 | Capone | H04L 63/029 709/227 |
| 2006/0242405 A1* | 10/2006 | Gupta | H04L 9/321 713/156 |
| 2006/0262808 A1* | 11/2006 | Lin | H04L 69/166 370/466 |
| 2007/0088959 A1* | 4/2007 | Cox | H04N 5/913 386/E5.07 |
| 2007/0147421 A1* | 6/2007 | Kim | H04L 61/2535 370/395.54 |
| 2007/0186100 A1* | 8/2007 | Wakameda | H04L 69/22 713/160 |
| 2007/0189486 A1* | 8/2007 | Ise | H04L 67/51 379/201.12 |
| 2008/0080509 A1* | 4/2008 | Khanna | H04L 63/0272 370/392 |
| 2008/0130515 A1* | 6/2008 | Vasseur | H04L 12/4633 370/254 |
| 2008/0148379 A1 | 6/2008 | Xu et al. | |
| 2008/0162924 A1* | 7/2008 | Chinitz | H04L 63/20 713/153 |
| 2008/0313240 A1* | 12/2008 | Freking | H04L 47/10 |
| 2009/0077618 A1 | 3/2009 | Pearce et al. | |
| 2009/0245204 A1* | 10/2009 | Voyer | H04W 36/18 370/331 |
| 2009/0287955 A1* | 11/2009 | Matsumoto | H04L 12/4633 714/E11.113 |
| 2010/0002693 A1 | 1/2010 | Rao et al. | |
| 2010/0005311 A1* | 1/2010 | Okamoto | H04L 9/3247 713/176 |
| 2010/0011056 A1* | 1/2010 | Bryson | H04L 67/54 709/203 |
| 2010/0024026 A1 | 1/2010 | Ylonen et al. | |
| 2010/0061253 A1 | 3/2010 | Kaminsky et al. | |
| 2010/0199325 A1 | 8/2010 | Raleigh | |
| 2010/0278338 A1* | 11/2010 | Chang | H04L 9/16 726/1 |
| 2010/0306816 A1* | 12/2010 | McGrew | H04L 63/08 726/1 |
| 2011/0032868 A1* | 2/2011 | Huang | H04L 12/4633 370/328 |
| 2011/0158237 A1* | 6/2011 | McDysan | H04L 67/51 370/392 |
| 2011/0161416 A1* | 6/2011 | McDysan | H04L 67/1061 709/204 |
| 2011/0261723 A1* | 10/2011 | Yamato | H04L 45/66 370/255 |
| 2011/0271093 A1* | 11/2011 | McKenna | G06F 21/62 713/150 |
| 2012/0014314 A1* | 1/2012 | Chen | H04W 84/047 370/428 |
| 2012/0084368 A1* | 4/2012 | Go | H04L 63/061 713/171 |
| 2012/0303835 A1* | 11/2012 | Kempf | H04L 41/0695 709/235 |
| 2012/0304276 A1* | 11/2012 | Legacy | H04L 63/0428 726/12 |
| 2013/0054761 A1* | 2/2013 | Kempf | H04L 47/781 709/221 |
| 2013/0083799 A1 | 4/2013 | Xie et al. | |
| 2013/0128892 A1 | 5/2013 | Rao et al. | |
| 2013/0163470 A1 | 6/2013 | Chidambaram et al. | |
| 2013/0166720 A1 | 6/2013 | Takashima et al. | |
| 2013/0232263 A1 | 9/2013 | Kelly et al. | |
| 2013/0318345 A1* | 11/2013 | Hengeveld | H04L 45/22 713/168 |
| 2013/0322255 A1 | 12/2013 | Dillon | |
| 2013/0336159 A1* | 12/2013 | Previdi | H04L 45/50 370/254 |
| 2014/0059356 A1* | 2/2014 | Nesnow | G06F 21/6272 713/189 |
| 2014/0101716 A1 | 4/2014 | Touboul | |
| 2014/0105382 A1* | 4/2014 | Liu | H04L 9/0662 380/28 |
| 2014/0108668 A1 | 4/2014 | Zhang et al. | |
| 2014/0122716 A1 | 5/2014 | Santhiveeran et al. | |
| 2014/0156720 A1* | 6/2014 | Janakiraman | H04L 49/3009 709/202 |
| 2014/0211799 A1* | 7/2014 | Yu | H04L 45/745 370/392 |
| 2014/0237137 A1 | 8/2014 | Ervin et al. | |
| 2014/0237539 A1 | 8/2014 | Wing et al. | |
| 2014/0241247 A1* | 8/2014 | Kempf | H04W 76/12 370/328 |
| 2014/0301396 A1* | 10/2014 | Hong | H04L 49/25 370/392 |
| 2014/0301397 A1 | 10/2014 | Zhou | |
| 2014/0334488 A1* | 11/2014 | Guichard | H04L 69/22 370/392 |
| 2014/0359159 A1* | 12/2014 | Diaz-Cuellar | H04L 63/0272 709/235 |
| 2015/0026768 A1* | 1/2015 | Wu | H04L 63/08 726/3 |
| 2015/0074756 A1 | 3/2015 | Deng et al. | |
| 2015/0085664 A1* | 3/2015 | Sachdev | H04L 41/0893 370/236 |
| 2015/0095648 A1* | 4/2015 | Nix | H04L 12/2854 713/170 |
| 2015/0109967 A1* | 4/2015 | Hogan | H04L 12/1407 370/259 |
| 2015/0121449 A1 | 4/2015 | Cp et al. | |
| 2015/0188949 A1* | 7/2015 | Mahaffey | H04L 41/0894 726/1 |
| 2015/0261972 A1* | 9/2015 | Lee | H04L 9/088 713/165 |
| 2015/0281060 A1* | 10/2015 | Xiao | H04L 45/74 709/238 |
| 2015/0281131 A1* | 10/2015 | Bhat | H04L 45/745 370/230 |
| 2015/0281173 A1* | 10/2015 | Quinn | H04L 41/0894 709/245 |
| 2015/0341259 A1 | 11/2015 | Li et al. | |
| 2015/0347768 A1 | 12/2015 | Martin et al. | |
| 2015/0371055 A1* | 12/2015 | Park | G06F 21/85 713/165 |
| 2016/0043866 A1* | 2/2016 | Nixon | G05B 19/418 713/168 |
| 2016/0092700 A1 | 3/2016 | Smith et al. | |
| 2016/0094661 A1* | 3/2016 | Jain | H04L 67/63 709/227 |
| 2016/0099917 A1 | 4/2016 | Glazemakers et al. | |
| 2016/0105471 A1* | 4/2016 | Nunes | H04L 12/4641 709/228 |
| 2016/0142293 A1 | 5/2016 | Hu et al. | |
| 2016/0180092 A1 | 6/2016 | Aktas | |
| 2016/0182550 A1 | 6/2016 | Spurlock | |
| 2016/0191380 A1* | 6/2016 | De | H04W 40/02 370/338 |
| 2016/0197830 A1* | 7/2016 | Ulevitch | H04L 63/0281 370/392 |
| 2016/0226779 A1* | 8/2016 | Kikuchi | H04L 67/53 |
| 2016/0261557 A1* | 9/2016 | Herrero | H04L 67/104 |
| 2016/0283728 A1* | 9/2016 | Antonopoulos | G06F 21/6209 |
| 2016/0285735 A1 | 9/2016 | Chen et al. | |
| 2016/0285846 A1 | 9/2016 | Abe | |
| 2016/0292430 A1* | 10/2016 | Antonopoulos | G06F 21/6227 |
| 2016/0294710 A1* | 10/2016 | Sreeramoju | H04L 47/2441 |
| 2016/0315853 A1* | 10/2016 | Liste | H04L 63/10 |
| 2016/0352685 A1 | 12/2016 | Park | |
| 2016/0359673 A1 | 12/2016 | Gupta et al. | |
| 2016/0360352 A1 | 12/2016 | Khan et al. | |
| 2016/0366108 A1* | 12/2016 | Kamble | H04L 63/10 |
| 2016/0366187 A1* | 12/2016 | Kamble | H04L 63/20 |
| 2016/0371484 A1 | 12/2016 | Mehta et al. | |
| 2016/0373304 A1* | 12/2016 | Sharma | H04L 43/00 |
| 2016/0378685 A1 | 12/2016 | Spurlock et al. | |
| 2016/0378975 A1 | 12/2016 | Pikhur et al. | |
| 2016/0379003 A1 | 12/2016 | Kapoor et al. | |
| 2016/0381051 A1 | 12/2016 | Edwards et al. | |

(56) References Cited

U.S. PATENT DOCUMENTS

| | | | |
|---|---|---|---|
| 2016/0381076 A1* | 12/2016 | Kamble | H04L 63/0209 726/1 |
| 2017/0012956 A1 | 1/2017 | Lee et al. | |
| 2017/0026349 A1* | 1/2017 | Smith | H04L 45/38 |
| 2017/0034052 A1* | 2/2017 | Chanda | H04L 45/586 |
| 2017/0041229 A1 | 2/2017 | Zheng | |
| 2017/0063782 A1 | 3/2017 | Jain et al. | |
| 2017/0063927 A1* | 3/2017 | Schultz | H04L 63/10 |
| 2017/0078184 A1 | 3/2017 | Tang et al. | |
| 2017/0099160 A1* | 4/2017 | Mithyantha | H04L 12/4641 |
| 2017/0104851 A1* | 4/2017 | Arangasamy | H04L 63/0428 |
| 2017/0118228 A1 | 4/2017 | Cp et al. | |
| 2017/0171055 A1* | 6/2017 | Wang | H04L 41/20 |
| 2017/0223063 A1* | 8/2017 | Herrero | H04L 65/1045 |
| 2017/0237552 A1* | 8/2017 | Karame | H04L 9/0637 380/28 |
| 2017/0237760 A1* | 8/2017 | Holeman | H04L 43/026 726/22 |
| 2017/0264695 A1* | 9/2017 | Markovitz | H04L 12/4633 |
| 2017/0317954 A1* | 11/2017 | Masurekar | H04L 41/0894 |
| 2017/0339631 A1 | 11/2017 | Pugaczewski et al. | |
| 2017/0346731 A1* | 11/2017 | Pukhraj Jain | H04L 45/38 |
| 2017/0353378 A1* | 12/2017 | Chen | H04L 45/08 |
| 2017/0359247 A1* | 12/2017 | Dixon | H04L 45/123 |
| 2017/0374025 A1 | 12/2017 | Pan | |
| 2018/0013786 A1 | 1/2018 | Knopf | |
| 2018/0018476 A1 | 1/2018 | Smith et al. | |
| 2018/0026949 A1 | 1/2018 | Kimn et al. | |
| 2018/0041470 A1* | 2/2018 | Schultz | H04L 45/22 |
| 2018/0063077 A1* | 3/2018 | Tumuluru | H04L 69/16 |
| 2018/0123827 A1* | 5/2018 | Josyula | H04L 12/4633 |
| 2018/0124183 A1* | 5/2018 | Kozat | H04L 41/0894 |
| 2018/0139176 A1* | 5/2018 | Sato | H04L 63/029 |
| 2018/0262487 A1* | 9/2018 | Zaifman | H04L 63/30 |
| 2018/0309786 A1* | 10/2018 | Apelewicz | H04W 12/04 |
| 2018/0324761 A1 | 11/2018 | Velev et al. | |
| 2018/0337788 A1* | 11/2018 | Gajek | H04L 9/14 |
| 2018/0359231 A1* | 12/2018 | Vemulapalli | H04L 9/3242 |
| 2019/0005148 A1* | 1/2019 | Lam | H04W 28/16 |
| 2019/0014152 A1 | 1/2019 | Verma et al. | |
| 2019/0021122 A1 | 1/2019 | Kawasaki et al. | |
| 2019/0036708 A1* | 1/2019 | Fregly | H04W 4/02 |
| 2019/0097805 A1 | 3/2019 | Shin et al. | |
| 2019/0109822 A1 | 4/2019 | Clark et al. | |
| 2019/0109848 A1 | 4/2019 | Clark et al. | |
| 2019/0155752 A1 | 5/2019 | Spurlock et al. | |
| 2019/0173736 A1 | 6/2019 | Ponnuswamy et al. | |
| 2019/0173850 A1* | 6/2019 | Jain | H04L 9/088 |
| 2019/0173891 A1 | 6/2019 | Cp et al. | |
| 2019/0190746 A1* | 6/2019 | Lee | H04L 47/20 |
| 2019/0205045 A1 | 7/2019 | Hugot et al. | |
| 2019/0207747 A1* | 7/2019 | Durvasula | H04L 61/2592 |
| 2019/0222559 A1 | 7/2019 | Wang et al. | |
| 2019/0238592 A1 | 8/2019 | Qureshi et al. | |
| 2019/0246148 A1* | 8/2019 | Oh | H04N 21/643 |
| 2019/0246160 A1* | 8/2019 | Williams | H04N 21/63345 |
| 2019/0278908 A1 | 9/2019 | Mehta et al. | |
| 2019/0306018 A1* | 10/2019 | Steverson | H04L 41/0806 |
| 2019/0306035 A1 | 10/2019 | Scheib et al. | |
| 2019/0312775 A1* | 10/2019 | Patil | H04L 41/085 |
| 2019/0313295 A1* | 10/2019 | Xu | H04W 28/0268 |
| 2019/0335022 A1* | 10/2019 | Pasam | H04L 67/147 |
| 2019/0349317 A1* | 11/2019 | Lu | H04L 45/74 |
| 2019/0349369 A1 | 11/2019 | Bengtson et al. | |
| 2019/0372948 A1* | 12/2019 | Varghese | H04L 63/0485 |
| 2019/0379532 A1* | 12/2019 | Si | H04L 9/0643 |
| 2019/0394049 A1 | 12/2019 | Hartwig et al. | |
| 2020/0036735 A1* | 1/2020 | Canard | H04L 9/14 |
| 2020/0052928 A1* | 2/2020 | Lee | H04L 12/4633 |
| 2020/0068049 A1* | 2/2020 | Ngo | H04L 45/28 |
| 2020/0076733 A1* | 3/2020 | Venkataraman | H04L 45/74 |
| 2020/0076740 A1* | 3/2020 | Kim | H04L 63/0428 |
| 2020/0076927 A1* | 3/2020 | Barthur | H04L 41/0893 |
| 2020/0112540 A1* | 4/2020 | Venkataraman | H04L 63/0263 |
| 2020/0119981 A1* | 4/2020 | Guthrie | H04L 63/0428 |
| 2020/0153604 A1* | 5/2020 | Sun | G06F 21/6218 |
| 2020/0162919 A1 | 5/2020 | Velev et al. | |
| 2020/0177550 A1 | 6/2020 | Valluri et al. | |
| 2020/0177606 A1 | 6/2020 | Valluri et al. | |
| 2020/0177658 A1* | 6/2020 | Barthur | H04L 65/70 |
| 2020/0184112 A1* | 6/2020 | Wallach | G06F 21/74 |
| 2020/0213154 A1 | 7/2020 | Han et al. | |
| 2020/0213280 A1* | 7/2020 | Guim Bernat | G06F 21/72 |
| 2020/0228503 A1* | 7/2020 | Zhang | H04L 9/0819 |
| 2020/0244625 A1 | 7/2020 | Tummalapenta et al. | |
| 2020/0252898 A1* | 8/2020 | Bild | H04W 40/28 |
| 2020/0274851 A1 | 8/2020 | Qiao et al. | |
| 2020/0287749 A1 | 9/2020 | Glazemakers et al. | |
| 2020/0314179 A1* | 10/2020 | He | H04L 43/20 |
| 2020/0351254 A1* | 11/2020 | Xiong | H04L 12/4633 |
| 2020/0389393 A1 | 12/2020 | Bosch et al. | |
| 2021/0218777 A1 | 7/2021 | Chander et al. | |
| 2021/0243163 A1 | 8/2021 | Miriyala et al. | |
| 2021/0266156 A1* | 8/2021 | Zee | H04L 9/083 |
| 2021/0266161 A1* | 8/2021 | Zee | H04L 9/0891 |
| 2021/0328830 A1* | 10/2021 | Kim | H04L 63/10 |
| 2021/0360083 A1 | 11/2021 | Duggal et al. | |
| 2022/0104181 A1 | 3/2022 | Velev et al. | |
| 2022/0109698 A1 | 4/2022 | Roh | |
| 2022/0247720 A1* | 8/2022 | Kim | H04L 12/4633 |
| 2023/0247003 A1 | 8/2023 | Chanak et al. | |

FOREIGN PATENT DOCUMENTS

| | | |
|---|---|---|
| CN | 107445011 A | 12/2017 |
| EP | 3254415 A1 | 12/2017 |
| JP | 2007243655 A | 9/2007 |
| JP | 2009163546 A | 7/2009 |
| JP | 2010011122 A | 1/2010 |
| JP | 2011015327 A | 1/2011 |
| JP | 2011166704 A | 8/2011 |
| JP | 5239341 B2 | 7/2013 |
| JP | 2015053069 A | 3/2015 |
| JP | 2016189127 A | 11/2016 |
| JP | 2017535843 A | 11/2017 |
| JP | 2017537501 A | 12/2017 |
| JP | 2018508140 A | 3/2018 |
| JP | 2018524843 A | 8/2018 |
| JP | 2019079504 A | 5/2019 |
| KR | 1020020088728 A | 11/2002 |
| KR | 1020030075810 A | 9/2003 |
| KR | 100692653 B1 | 3/2007 |
| KR | 1020070037650 A | 4/2007 |
| KR | 100748698 B1 | 8/2007 |
| KR | 1020070102698 A | 10/2007 |
| KR | 100856674 B1 | 8/2008 |
| KR | 1020100008740 A | 1/2010 |
| KR | 101020470 B1 | 2/2011 |
| KR | 1020120045859 A | 5/2012 |
| KR | 101173583 B1 | 8/2012 |
| KR | 1020130045919 A | 5/2013 |
| KR | 1020130076798 A | 7/2013 |
| KR | 1020140055857 A | 5/2014 |
| KR | 1020140074357 A | 6/2014 |
| KR | 101481337 B1 | 1/2015 |
| KR | 1020150013453 A | 2/2015 |
| KR | 1020150088494 A | 8/2015 |
| KR | 101561108 B1 | 10/2015 |
| KR | 101578193 B1 | 12/2015 |
| KR | 1020160029660 A | 3/2016 |
| KR | 1020160056118 A | 5/2016 |
| KR | 1020160123069 A | 10/2016 |
| KR | 1020170010835 A | 2/2017 |
| KR | 101743559 B1 | 6/2017 |
| KR | 1020170063795 A | 6/2017 |
| KR | 1020170132608 A | 12/2017 |
| KR | 1020180006413 A | 1/2018 |
| KR | 1020180019273 A | 2/2018 |
| KR | 1020180030023 A | 3/2018 |
| KR | 1020180032864 A | 4/2018 |
| KR | 101861201 B1 | 5/2018 |
| KR | 1020180062838 A | 6/2018 |
| KR | 1020180086964 A | 8/2018 |
| KR | 101910605 B1 | 10/2018 |

(56) References Cited

FOREIGN PATENT DOCUMENTS

| KR | 1020180132868 A | 12/2018 |
|---|---|---|
| KR | 2019-0037088 A | 4/2019 |
| KR | 1020190036504 A | 4/2019 |
| KR | 1020190052541 A | 5/2019 |
| KR | 1020190073114 A | 6/2019 |
| KR | 102119257 B1 | 6/2020 |
| KR | 102146568 B1 | 8/2020 |
| WO | WO 2013170177 A1 | 11/2013 |
| WO | 2014062337 A1 | 4/2014 |
| WO | 2016057177 A1 | 4/2016 |
| WO | 2016190641 A1 | 12/2016 |
| WO | 2017016473 A1 | 2/2017 |
| WO | WO 2017081864 A1 | 5/2017 |
| WO | WO 2017126556 A1 | 7/2017 |
| WO | WO 2018116123 A1 | 6/2018 |
| WO | 2021060856 A1 | 4/2021 |

OTHER PUBLICATIONS

Extended European Search Report dated Oct. 17, 2022 for European Pat. App. No. 20868932.3.
International Search Report and Written Opinion of the International Searching Authority; Application No. PCT/KR2020/012924; Completed: Jan. 5, 2021; Mailing Date: Jan. 5, 2021; 11 Pages.
Hassan, Suhaidi, et al.; Border Gateway Protocol based Path Vector mechanism for inter-domain routing in Software Defined Network environment; IEEE Conference on Open Systems (ICOS); Langkawi, Malaysia; Oct. 10, 2016; 5 Pages.
Glatz, Eduard, et al.; Classifying Internet One-way Traffic; Proceedings of the 12th ACM SIGMETRICS/Performance joint international conference on Measurement and Modeling of Computer Systems (SIGMETRICS 12); Association for Computing Machinery; New York, NY, USA; May 15, 2012; 29 Pages.
Bilger, Brent, et al.; Cloud Security Alliance (CSA); Software-Defined Perimeter Working Group (SDP) Specification 1.0; Apr. 2014; 28 Pages.
Garbis, Jason, et al.; Cloud Security Alliance (CSA); Software-Defined Perimeter Architecture Guide; Mar. 10, 2020; 43 Pages.
Waliyi, Adebayo Gbenga; Study and Implementation of Wireless Sensor Networks to Manage Energy in a Smart Home; African University of Science and Technology; AUST Institutional Repository; Abuja, Nigeria; Dec. 15, 2017; 69 Pages.
Ikuta, Takayuki, et al.; Software Defined Perimeter (SDP) Usage Scenario Collection, Version 1.0; Japan Cloud Security Alliance, SDP Working Group; Apr. 25, 2019; 52 Pages.
Korean Office Action; Application No. 10-2020-0117543; Mailed: Nov. 13, 2020; 6 pages.
Korean Notice of Allowance; Application No. KR 10-2020-0105345; Dated: May 2, 2021.
Japanese Office Action; Application No. 2021-039780; Issued: Jun. 8, 2021; 13 Pages.
Extended European Search Report; Application No. 21162189.1; Completed: Jul. 7, 2021; Issued: Jul. 16, 2021; 44 Pages.
US Notice of Allowance; U.S. Appl. No. 16/580,974; Issued: Mar. 14, 2022; 8 Pages.
Japanese First Office Action; Application No. 2022-515499; 7 Pages.
Japanese Office Action; Application No. 2022002658; Issued: Mar. 3, 2022; 10 Pages.
Japanese Office Action issued Dec. 5, 2024 for Japanese Patent Appl. No. 2023136154.

* cited by examiner

NETWORK ACCESS CONTROL SYSTEM AND METHOD THEREFOR

CROSS-REFERENCE TO RELATED APPLICATIONS

The present application is the National Stage of International Application No. PCT/KR2020/012924, filed on Sep. 24, 2020, which claims priority from U.S. patent application Ser. No. 16/580,866, filed on Sep. 24, 2019, and Ser. No. 16/580,974, filed on Sep. 24, 2019. International Application No. PCT/KR2020/012924 also claims priority to Korean Patent Application No. 10-2020-0045526, filed on Apr. 14, 2020. The present application is a continuation-in-part of U.S. patent application Ser. No. 16/580,974, filed on Sep. 24, 2019. All prior applications are herein incorporated by reference.

TECHNICAL FIELD

The present disclosure relates to technologies of controlling network access of a terminal based on a tunnel between a plurality of networks.

BACKGROUND ART

Because an environment of controlling network access of a terminal based on a tunneling technology is able to allow an authorized terminal to access a target network through an authorized tunnel to fundamentally block access of an unauthorized terminal or access using a general TCP/IP mechanism, there are advantages capable of minimizing security and threat inherent in the TCP/IP and authorizing network access based on various pieces of identification information (a terminal ID, a user ID, and the like) in a network access process based on an IP address.

The tunneling technology used in general, for example, IP security protocol virtual private network (IPSec VPN), Open VPN, or generic routing encapsulation (GRE) tunneling, is based on an access target for each terminal or each network, and a secure socket layer (SSL)/transport layer security (TLS) VPN is devised to be connected to an access target for each smaller web service.

Such a tunneling technology is a network technology which operates in Layer 3/4 and Layer 7 of open system interconnection (OSI) and establishes a criterion (entity) transmitting data packets to the network for each terminal (source node). Because the network access of the terminal is by a request of each application (a transmission request of a data packet) run (operated) on the terminal, the tunneling technology established for each terminal has a structure incapable of performing access control for each application.

Therefore, a tunnel is a minimal controllable unit, and should be able to control flow of data packets for each application and each destination network and should be able to block data packets transmitted from a terminal or network boundary to an unauthorized tunnel or unauthorized data packets.

Particularly, when data packets are transmitted to a cloud service network over an uncontrollable network (e.g., the Internet, a mobile network operator network, or the like) depending on a destination or should pass through a plurality of network boundaries between networks for each resource or each segment which should be protected in an internal network, that is, when there are a plurality of network boundaries in which different management policies are accompanied on a path to a destination, a series of technologies for routing only authorized flow to a boundary of a destination network should be accompanied at the same time as a technology for blocking the unauthorized flow.

In general, a VPN technology is used or a multi-protocol label switching (MPLS) and dynamic multipoint VPN (DMVPN) technology is used, to support a boundary and a boundary of networks. However, control of authorized flow and unauthorized flow, and a control method for routing of the authorized flow are not provided, and network access control (NAC) and firewall technologies should be essentially applied for partial network control.

A terminal may be protected by an end to end security (EES) technology or a technology such as SSL/TLS to ensure confidentiality of data packets depending on an application of an active state and a destination service. However, because the VPN technology encrypts and encapsulates all data packets which start from the terminal by means of a tunneling technology, there is a problem in which data packets are doubly encrypted when having different protection systems depending on a destination service.

Details described in the background art are written to increase the understanding of the background of the present disclosure, which may include details rather than an existing technology well known to those skilled in the art.

DISCLOSURE

Technical Problem

An aspect of the present disclosure provides an apparatus for controlling network access to generate a tunnel connecting an application of a terminal with a gateway of a destination network, based on a tunnel between the application of the terminal and the gateway and a tunnel between the gateway and the gateway, in a tunnel-based access control network environment configured with a plurality of networks, such that a data packet from the application of the terminal may be securely transmitted to a destination node, and a method thereof.

The technical problems to be solved by the present disclosure are not limited to the aforementioned problems, and any other technical problems not mentioned herein will be clearly understood from the following description by those skilled in the art to which the present disclosure pertains. Furthermore, it may be easily seen that purposes and advantages of the present disclosure may be implemented by means indicated in claims and a combination thereof.

Technical Solution

According to an aspect of the present disclosure, an apparatus for controlling network access device may include a memory storing a tunnel policy, a tunnel routing policy, and a tunnel table and a control device that generates tunnel information and data flow information based on the tunnel policy, the tunnel routing policy, and the tunnel table depending on a network access request of a terminal and transmits the generated tunnel information and the generated data flow information to the terminal and a gateway of each network such that a tunnel between the terminal and a destination network is generated. The control device may generate the data flow information based on information of the destination network and an application ID of the terminal or the information of the destination network and an ID of the terminal.

In an embodiment of the present disclosure, the control device may identify a routing path of each tunnel located on a communication path from the terminal to the destination network based on the tunnel policy and the tunnel routing policy and may identify whether an available tunnel is present based on the tunnel table.

In an embodiment of the present disclosure, the control device may generate and transmit the tunnel information and the data flow information to the terminal and the gateway of each network, when an available tunnel is present in each section from the terminal to the destination network.

In an embodiment of the present disclosure, the control device may transmit information necessary to generate a tunnel together with the generated tunnel information and the generated data flow information to the terminal and the gateway of each network, when an available tunnel is present in each section from the terminal to the destination network.

In an embodiment of the present disclosure, the control device may transmit the data flow information including whether network address translation (NAT) is performed, an NAT address, whether encryption is performed, an encryption algorithm, or an encryption key to the terminal.

In an embodiment of the present disclosure, the control device may transmit the data flow information including network address translation (NAT) is performed, an NAT address, a data flow header, whether decryption is performed, a decryption algorithm, a decryption key, whether routing is performed, or a routing tunnel ID to the gateway of each network.

According to another aspect of the present disclosure, a method for controlling network access device may include storing a tunnel policy, a tunnel routing policy, and a tunnel table, generating tunnel information and data flow information based on the tunnel policy, the tunnel routing policy, and the tunnel table depending on a network access request of a terminal, and transmitting the generated tunnel information and the generated data flow information to the terminal and a gateway of each network such that a tunnel between the terminal and a destination network is generated. The data flow information may be generated based on information of the destination network and an application ID of the terminal or the information of the destination network and an ID of the terminal.

An embodiment of the present disclosure may include identifying a routing path of each tunnel located on a communication path from the terminal to the destination network based on the tunnel policy and the tunnel routing policy and identifying whether an available tunnel is present based on the tunnel table.

An embodiment of the present disclosure may include transmitting the generated tunnel information and the generated data flow information to the terminal and the gateway of each network, when an available tunnel is present in each section from the terminal to the destination network and transmitting information necessary to generate a tunnel together with the generated tunnel information and the generated data flow information to the terminal and the gateway of each network, when the available tunnel is present in each section from the terminal to the destination network.

In an embodiment of the present disclosure, the data flow information transmitted to the terminal may include whether network address translation (NAT) is performed, an NAT address, whether encryption is performed, an encryption algorithm, or an encryption key.

In an embodiment of the present disclosure, the data flow information transmitted to the gateway of each network may include whether network address translation (NAT) is performed, an NAT address, a data flow header, whether decryption is performed, a decryption algorithm, a decryption key, whether routing is performed, or a routing tunnel ID.

According to another aspect of the present disclosure, a method for controlling network access device may include receiving data flow information, performing a manipulation process in a data packet based on the data flow information, and transmitting the data packet, the manipulation process of which is performed, through a tunnel to a destination network. The data flow information may be generated based on information of the destination network and an application ID of the terminal or the information of the destination network and an ID of the terminal.

An embodiment of the present disclosure may include replacing a destination IP and port information based on an NAT address included in the data flow information.

An embodiment of the present disclosure may include encrypting the data packet based on a type of an encryption algorithm and an encryption key included in the data flow information, inserting a header included in the data flow information into the encrypted data packet, and fragmenting and transmitting the data packet into which the header is inserted.

According to another aspect of the present disclosure, a method for controlling network access device may include receiving a data packet from a terminal through an authorized tunnel, identifying whether the data packet is authorized based on a header included in previously stored data flow information, decrypting the authorized data packet based on whether decryption is performed, a decryption algorithm, and a decryption key included in the data flow information, replacing an IP header of the decrypted data packet with a network address translation (NAT) address based on whether NAT is performed and the NAT address included in the data flow information, and removing the header of the data packet, the header being replaced with the NAT address. The data flow information may be generated based on information of a destination network and an application ID of the terminal or the information of the destination network and an ID of the terminal.

An embodiment of the present disclosure may include determining the data packet as an authorized data packet, when a header is present in the data packet and is identical to a header included in the data flow information.

An embodiment of the present disclosure may further include receiving and processing the data packet, the header of which is removed, when the gateway is a gateway of the destination network.

An embodiment of the present disclosure may further include forwarding the data packet, the header of which is removed, to a gateway of the destination, when the gateway is not the gateway of the destination network.

Advantageous Effects

The system for controlling the network access and the method thereof according to an embodiment of the present disclosure may generate a tunnel connecting an application of a terminal with a gateway of a destination network, based on a tunnel between the application of the terminal and the gateway and a tunnel between the gateway and the gateway, in a tunnel-based access control network environment configured with a plurality of networks, such that a data packet from the application of the terminal may be securely transmitted to a destination node.

MODE FOR INVENTION

Figure 1:
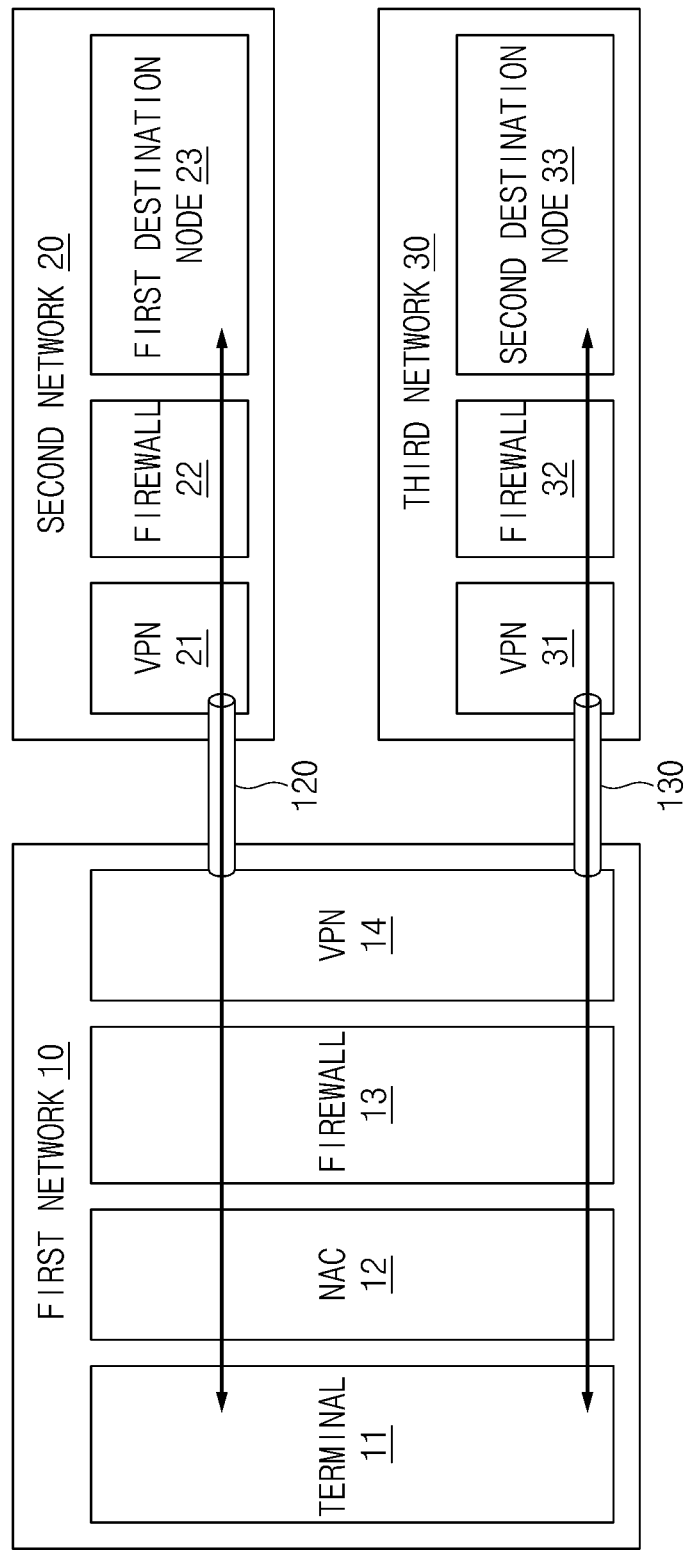
FIG. 1 is a drawing illustrating a network environment to which an embodiment of the present disclosure is applied.

Hereinafter, various embodiments of the disclosure may be described with reference to accompanying drawings. However, it should be understood that this is not intended to limit the present disclosure to specific implementation forms and includes various modifications, equivalents, and/or alternatives of embodiments of the present disclosure.

A singular form of a noun corresponding to an item in the present disclosure may include one or plural of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Each (e.g., a module or a program) of components described in the present disclosure may include singular or plural entities. According to various embodiments, one or more of corresponding components or operations may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As used in the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

Various embodiments of the present disclosure may be implemented as software (e.g., a program or an application) including instructions that are stored in a machine-readable storage medium (e.g., a memory). For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device and does not include a signal (e.g., an electromagnetic wave), but this term does not differentiate between where data is semipermanently stored in the storage medium and where data is temporarily stored in the storage medium.

A method according to various embodiments disclosed in the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least a part of the computer program product may be temporarily generated or at least temporarily stored in the machine-readable storage medium, such as a memory of the manufacturer's server, a server of the application store, or a relay server.

FIG. 1 is a drawing illustrating a network environment to which an embodiment of the present disclosure is applied. Three networks 10, 20, and 30 will be described as an example to help understanding, but the number of networks has no effect on the present disclosure. At this time, the respective networks 10, 20, and 30 may be different networks. For example, the first network 10 may be a public network such as the Internet, and the second and third networks 20 and 30 may be private networks such as intranets or VPNs.

As shown in FIG. 1, the network environment (e.g., a transcription network environment) to which an embodiment of the present disclosure is applied may be configured with the plurality of networks 10, 20, and 30. The first network 10 in which a terminal 11 to transmit data to a first destination node 23 or a second destination node 33 is included may be connected with the second network 20 through at least one or more tunnels 120 and may be connected with the third network 30 through at least one or more tunnels 130.

A terminal 11 may be various types of devices capable of performing data communication. For example, the terminal 11 may include a portable device, such as a smartphone and a tablet, a computer device, such as a desktop or a laptop, a multimedia device, a medical device, a camera, a wearable device, a virtual reality (VR) device, or a home appliance, but not limited to the above-mentioned devices. The terminal 11 may be referred to as an 'electronic device' or a 'node'.

The terminal 11 may attempt to access the second network 20 or the third network 30, and may transmit data to the first destination node 23 included in the second network 20 through the tunnel 120 or may transmit data to the second destination node 33 included in the third network 30 through the tunnel 130. At this time, the first destination node 23 and the second destination node 33 may include an electronic device, such as a terminal, as well as a server.

When access of the terminal 11 to the second network 20 is granted, the terminal 11 may communicate with the first destination node 23 included in the second network 20. When access of the terminal 11 to the third network 30 is granted, the terminal 11 may communicate with the second destination node 33 included in the third network 30.

Security solutions such as an NAC 12, a firewall 13, and a VPN 14 are applicable to a boundary of the first network 10, and security solutions such as a VPN 21 and a firewall 22 are applicable to a boundary of the second network 20 and a boundary of the third network 30. A network environment in which various security solutions (equipment) are applied to the boundary of the network has problems of investment cost (CAPEX) and operation cost (OPEX), difficulties with policy establishment and management for each equipment, or problems with security and management of a TCP/IP technology, limited network section protection technology application, or the like.

Figure 2:
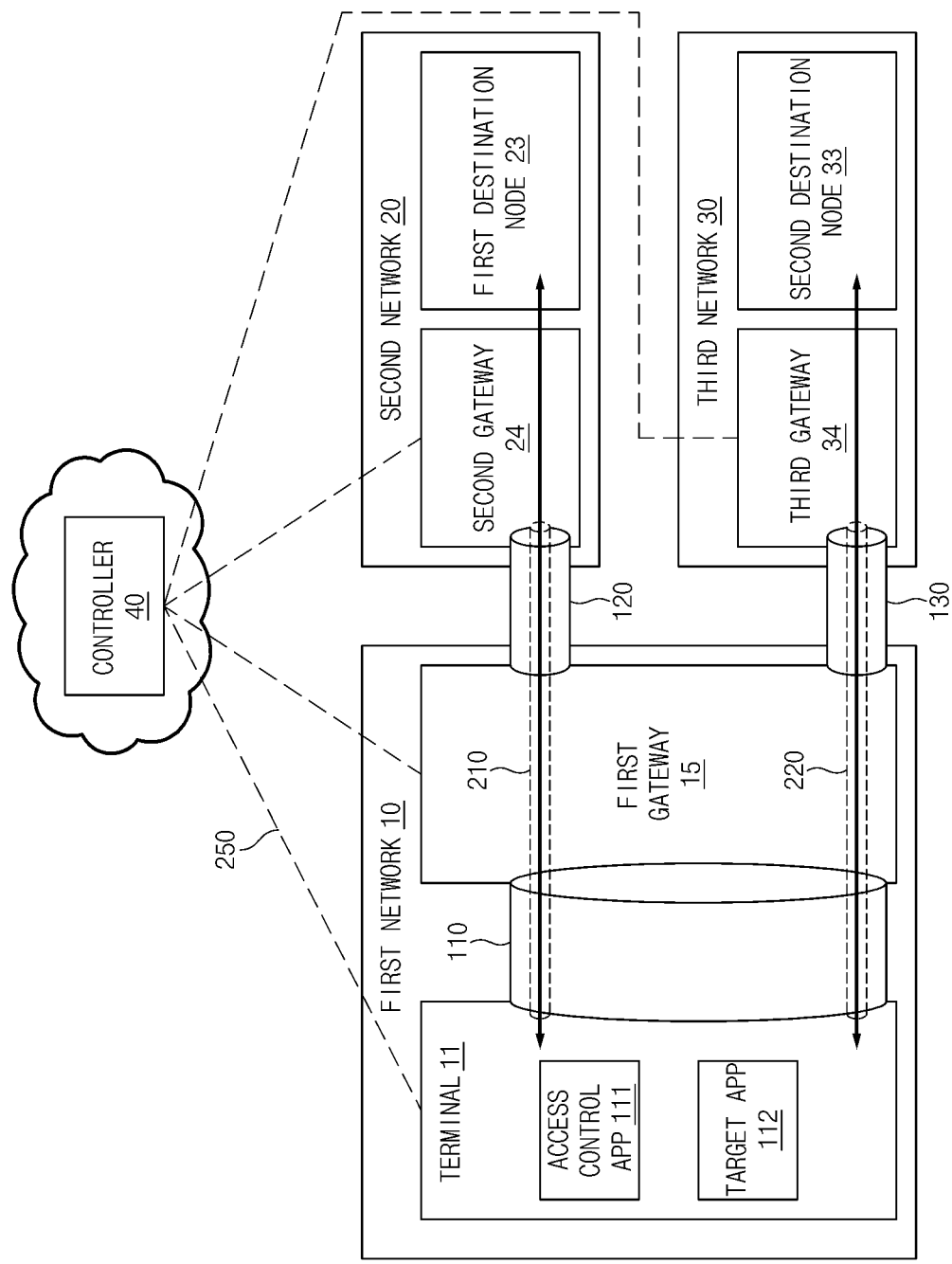
FIG. 2 is a drawing illustrating a configuration of a system for controlling network access according to an embodiment of the present disclosure.

FIG. 2 is a drawing illustrating a configuration of a system for controlling network access according to an embodiment of the present disclosure.

As shown in FIG. 2, the system for controlling the network access according to an embodiment of the present disclosure may include a first network 10, a second network 30, a third network 30, a controller 40, or the like.

The first network 10 may include a terminal 11 and a first gateway 15. The second network 20 may include a second gateway 24 and a first destination node 23. The third network 30 may include a third gateway 34 and a second destination node 33.

The terminal 11 and the first gateway 15 may be connected through a first tunnel 110. The first gateway 15 and the second gateway 24 may be connected through a second tunnel 120. The first gateway 15 and the third gateway 34 may be connected through a third tunnel 130.

The terminal 11 may communicate with the first destination node 23 of the second network 20 through a fourth tunnel 210 connecting the first tunnel 110 with the second tunnel 120 and may communicate with the second destination node 33 of the third network 30 through a fifth tunnel 220 connecting the first tunnel 110 with the third tunnel 130. At this time, the fourth tunnel 210 may connect an access control application 111 in the terminal 11 with the first destination node 23, and the fifth tunnel 220 may connect the access control application 111 in the terminal 11 with the second destination node 33. A target application 112 may transmit a data packet to the first destination node 23 or the second destination node 33 under control of the access control application 111. The four tunnel 210 and the fifth tunnel 220 may refer to a tunnel routing technology among the first tunnel 110, the second tunnel 120, and the third tunnel 130.

The terminal 11 may include the access control application 111 for managing network access of an application stored in the terminal 11 and a network driver (not shown). For example, when an access event of the target application 112 included in the terminal 11 to the first destination node 23 occurs, the access control application 111 may determine whether access of the target application 112 is possible. When the access of the target application 112 is possible, the access control application 111 may transmit a data packet to the second gateway 24 through the fourth tunnel 210. In other words, the access control application 111 may control transmission of a data packet by means of a kernel including an operating system in the terminal 11 and the network driver. The access control application 111 may play a role as a kind of agent in conjunction with network access of the target application 112.

The controller 40 may be a network access control device, which may be implemented as, for example, a server (or a cloud server). The controller 40 may manage data transmission between the respective gateways 15, 24, and 34 to ensure reliability of the data transmission in a network environment. For example, the controller 40 may manage access of the terminal 11 to the destination network 20 or 30 by means of policy information or blacklist information, may mediate generation of the authorized first tunnel 110 between the terminal 11 and the first gateway 15, may mediate generation of the authorized second tunnel 120 between the first gateway 15 and the second gateway 24, may mediate generation of the authorized third tunnel 130 between the first gateway 15 and the third gateway 34, may mediate generation of the authorized fourth tunnel 210 between the terminal 11 and the second gateway 24, may mediate generation of the authorized fifth tunnel 220 between the terminal 11 and the third gateway 34, or may remove each tunnel 110, 120, 130, 210, or 220 depending on a security event collected from each gateway 15, 24, or 34. The terminal 11 may communicate with the destination network 20 or 30 through only the tunnel authorized by the controller 40. When there is no authorized tunnel, access of the terminal 11 to the destination network 20 or 30 may be blocked. According to an embodiment, the controller 40 may transmit and receive a control data packet with the terminal 11 to perform various operations (e.g., registration, grant, authentication, update, and end) associated with network access of the terminal 11. Flow (e.g., 250) in which the control data packet is transmitted may be referred to as control flow.

The controller 40 may propagate data flow including information which should be processed for each node which is present on a communication path, in conjunction with mediating the access, to provide a structure in the form of a dynamic policy, which provides a necessary access control policy at a necessary time. For example, data flow information and tunnel information between the terminal 11 and the first gateway 15 may be transmitted to the terminal 11, data flow information or/and tunnel information between the first gateway 23 and the second gateway 24 may be transmitted to the first gateway 23, and data flow information or/and tunnel information between the second gateway 24 and the first destination node may be transmitted to the second gateway 24. Because the data flow includes a structure in the form of a similar tunnel including header information for determining whether there are authorized flow and an authorized data packet, whether the data packet is encrypted, an encryption algorithm, encryption key information, data packet manipulation information, and the like, data packet control optimized for various flow generated between one terminal and multiple destinations is possible.

Each gateway 15, 24, or 34 may generate the authorized tunnel 110, 120, 130, 210, or 220 with the terminal 11 under control of the controller 40. As an example, the second gateway 24 may forward a data packet, received through the authorized tunnel 210, to the first destination node 23. Flow (e.g. 270) in which a data packet is transmitted among the terminal 11, the first gateway 15, and the second gateway 24 may be referred to as data flow. Each gateway 15, 24, or 34 may be connected with the controller 40 based on a cloud.

Each gateway 15, 24, or 34 may further include communication circuitry (e.g., communication circuitry 430 of FIG. 4) for performing communication with an external electronic device (e.g., a terminal 11 of FIG. 2 or a server) and a processor (e.g., a processor 410 of FIG. 4) for controlling the overall operation of the gateway 203.

Each gateway 15, 24, or 34 may perform processing, such as routing, decryption, or network address translation (NAT) of the data packet, based on the data flow received from the controller 40.

Figure 3:
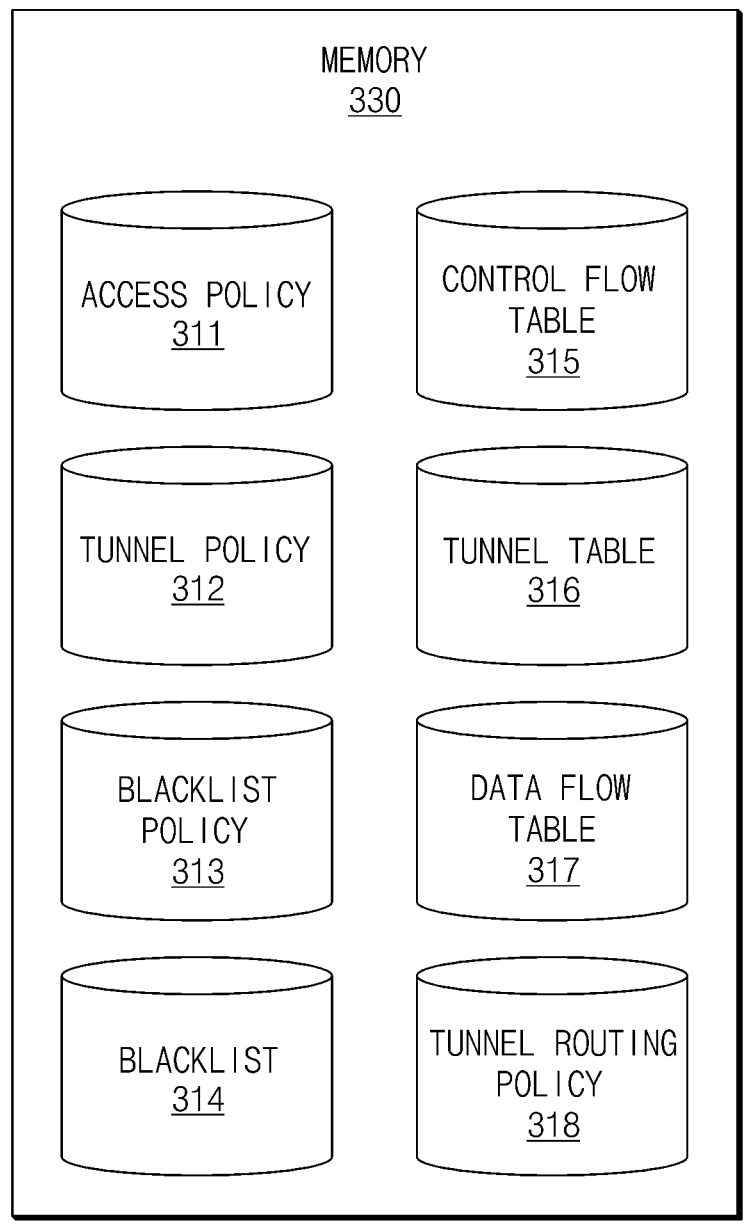
FIG. 3 is a drawing illustrating a database provided in a controller of a system for controlling network access according to an embodiment of the present disclosure.

FIG. 3 is a drawing illustrating a database provided in a controller of a system for controlling network access according to an embodiment of the present disclosure.

As shown in FIG. 3, respective databases 311 to 318 provided in the controller of the system for controlling the network access according to an embodiment of the present disclosure may be stored in a memory 330. Such databases 311 to 318 may be used to control a network access process and a data packet transmission process. The tunnel table 316 and the data flow table 317 may be stored in the terminal 11 and each gateway 15, 24, or 34 in the same manner.

The access policy database 311 may include information about an identified network, a network accessible by a terminal, a user or an application, and/or a service. For example, when access to a destination network is requested from the terminal, a controller may determine whether the identified network (e.g., the network to which the terminal belongs), the terminal, the user (e.g., the user of the terminal), and/or the application (e.g., the application included in the terminal) is accessible to the destination network based on the access policy database 311.

The tunnel policy database 312 may include a type of each tunnel 110, 120, 130, 210, or 220 on a connection path, an encryption method, and encryption level information. For example, when access to a destination network 20 or 30 is requested from the terminal, a controller 40 may provide the terminal with an optimal tunnel for accessing the destination network 20 or 30 and information about it based on the tunnel policy database 312.

The blacklist policy database 313 may include a policy for permanently or temporarily blocking access of a specific terminal. The blacklist policy database 313 may be generated based on a risk level of a security event among security events collected on a periodic basis from the terminal or the gateway, a cycle of occurrence, and/or information identified by means of an action analysis (e.g., at least one of a terminal identifier (ID), an IP address, a media access control (MAC) address, a user ID).

The blacklist database 314 may include a list of at least one of a terminal, an IP address, a MAC address, or a user blocked by the blacklist policy database 313. For example, when identification information of the terminal requesting to access the destination network is included in the blacklist database 314, the controller may deny the access request of the terminal to separate the terminal from the destination network.

The control flow table 315 is an example of a session table for managing flow (e.g., control flow) of a control data packet generated between the terminal and the controller. When the terminal successfully accesses the controller, control flow information may be generated by the controller. The control flow information may include at least one of identification information of control flow, an IP address identified when accessing and authenticating the controller, a terminal ID, or a user ID. For example, when access to the destination network is request from the terminal, the controller may search for control flow information by means of the control flow identification information received from the terminal and may map at least one of the IP address, the terminal ID, or the user ID included in the found control flow information to the access policy database 311, thus determining whether access of the terminal is possible and whether to generate a tunnel.

According to an embodiment, the control flow may have an expiration time. The terminal should update the expiration time of the control flow. When the expiration time is not updated during a certain time, the control flow (or control flow information) may be removed. Furthermore, when it is determined to need to immediately block access depending on a security event collected from the terminal or the gateway, the controller may remove the control flow depending on an access end request of the terminal. When the control flow is removed, because the tunnel and the data flow, which are previously generated, are also removed, access of the terminal to a network may be blocked.

The tunnel table 316 may be a table for managing a tunnel connected between the terminal and the gateway or a destination node. The tunnel may be generated for, for example, each device or IP. When a tunnel is generated between the terminal and the gateway, the tunnel table 316 may include tunnel identification information, control flow identification information when the tunnel is dependent on control flow, a tunnel end point (TEP), a tunnel start point (TSP), a tunnel algorithm, a tunnel type, and/or additional information for managing the tunnel.

The data flow table 317 may be a table for managing flow (e.g., data flow) in which a detailed data packet is transmitted between the terminal and the gateway or the destination node. The data flow may be generated for each TCP session in the tunnel, for each application of a source terminal, or in a more detailed unit. The data flow table 317 may include data flow identification information, control flow identification (ID) information when data flow is dependent on control flow, sequential tunnel routing information for each section when passing through one or more gateways on a communication path, whether a data packet is encrypted or decrypted in each section, encryption and decryption algorithms, encryption and decryption keys, header information for detecting whether a data packet transmitted from the terminal is an authorized data packet, a tunnel ID corresponding to each data flow, an application ID for identifying data flow of an authorized target, a destination IP address, and/or a service port.

The tunnel routing policy database 318 may include a type of each tunnel 110, 120, 130, 210, or 220 on a connection path, an encryption method, and encryption level information. For example, when access to the destination network 20 or 30 is requested from the terminal, the controller 40 may provide the terminal with an optimal tunnel for accessing the destination network 20 or 30 and information about it based on the tunnel policy database 312.

Figure 4:
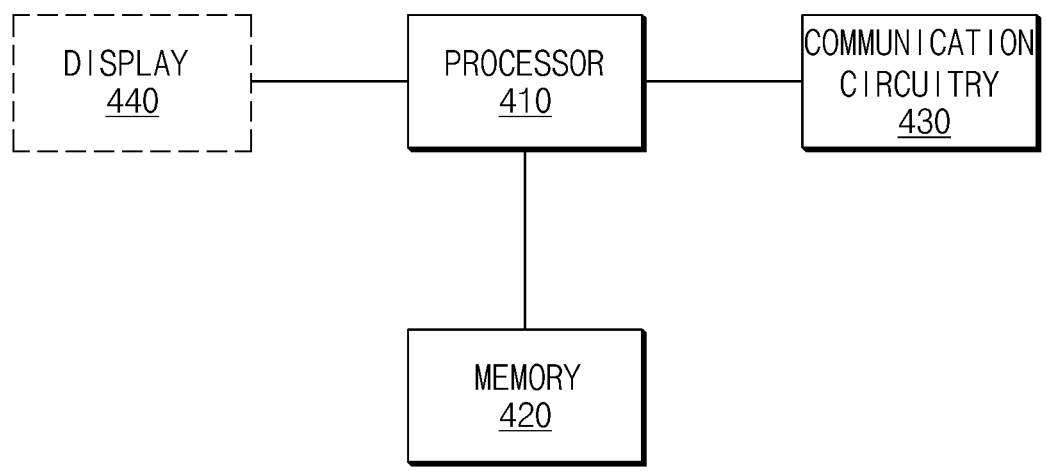
FIG. 4 is a drawing illustrating a configuration of a terminal of a system for controlling network access according to an embodiment of the present disclosure.

FIG. 4 is a drawing illustrating a configuration of a terminal of a system for controlling network access according to an embodiment of the present disclosure.

As shown in FIG. 4, a terminal 11 of the system for controlling the network access according to an embodiment of the present disclosure may include a processor 410, a memory 420, and communication circuitry 430. Furthermore, the terminal 11 may further include a display 440 for performing an interface with a user.

The processor 410 may control the overall operation of the terminal 11. The processor 410 may include one processor single core or may include a plurality of processor cores. For example, the processor 410 may include a multi-core such as a dual-core, a quad-core, or a hexa-core. According to embodiments, the processor 410 may further include a cache memory located internally or externally. According to various embodiments, the processor 410 may be configured with one or more processors. For example, the processor 410 may include at least one of an application processor, a communication processor, or a graphical processing unit (GPU).

All or a portion of the processor 410 may be electrically or operatively combined or connected with another component (e.g., the memory 420, the communication circuitry 430, or the display 440) in the terminal. The processor 410 may receive commands of other components of the terminal, may interpret the received commands, and may perform calculation or may process data, depending on the interpreted commands. The processor 410 may interpret and process a message, data, an instruction, or a signal received from the memory 420, the communication circuitry 430, or the display 440. The processor 410 may generate a new message, data, instruction, or signal based on the received message, data, instruction, or signal. The processor 410 may provide the memory 420, the communication circuitry 430, or the display 440 with the processed or generated message, data, instruction, or signal.

The processor 410 may process data or a signal which is generated or occurs by a program. For example, the processor 410 may request an instruction, data, or a signal from the memory 420 to run or control the program. The processor 410 may record (or store) or update an instruction, data, or a signal in the memory 420 to run or control the program.

The memory 420 may store an instruction controlling the terminal 11, a control instruction code, control data, or user data. For example, the memory 420 may include at least one of an application program, an operating system (OS), middleware, or a device driver.

The memory 420 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like.

The memory 420 may further include a non-volatile medium such as a hard disk drive (HDD), a solid state disk (SSD), an embedded multi media card (eMMC), or a universal flash storage (UFS).

According to an embodiment, the memory 420 may store some of pieces of information included in a memory (e.g., a memory 330 of FIG. 3) of a controller 40. For example, the memory 420 may store a tunnel table 316 and a data flow table 317 described in FIG. 3.

The communication circuitry 430 may assist in establishing a wired or wireless communication connection between the terminal and an external electronic device (e.g., the controller 40 of FIG. 2, each gateway 15, 24, or 34 of FIG. 2, or a destination node (a server, a terminal, or the like)) and performing communication through the established connection. According to an embodiment, the communication circuitry 430 may include wireless communication circuitry (e.g., cellular communication circuitry, short range wireless communication circuitry, or global navigation satellite system (GNSS) communication circuitry) or wired communication circuitry (e.g., local area network (LAN) communication circuitry or power line communication circuitry) and may communicate with the external electronic device over a short range communication network, such as Bluetooth, WiFi direct, or infrared data association (IrDA), or a long range communication network, such as a cellular network, the Internet, or a computer network using the corresponding communication circuitry among them. The above-mentioned several types of communication circuitry 430 may be implemented as one chip or may be respectively implemented as separate chips.

The display 440 may output content, data, or a signal. The display 440 may display image data processed by the processor 410. The display 440 may be combined with a plurality of touch sensors (not shown) capable of receiving a touch input or the like to be configured with an integrated touch screen. When the display 440 is configured with the touch screen, the plurality of touch sensors may be arranged over the display 440 or under the display 440.

Figure 5:
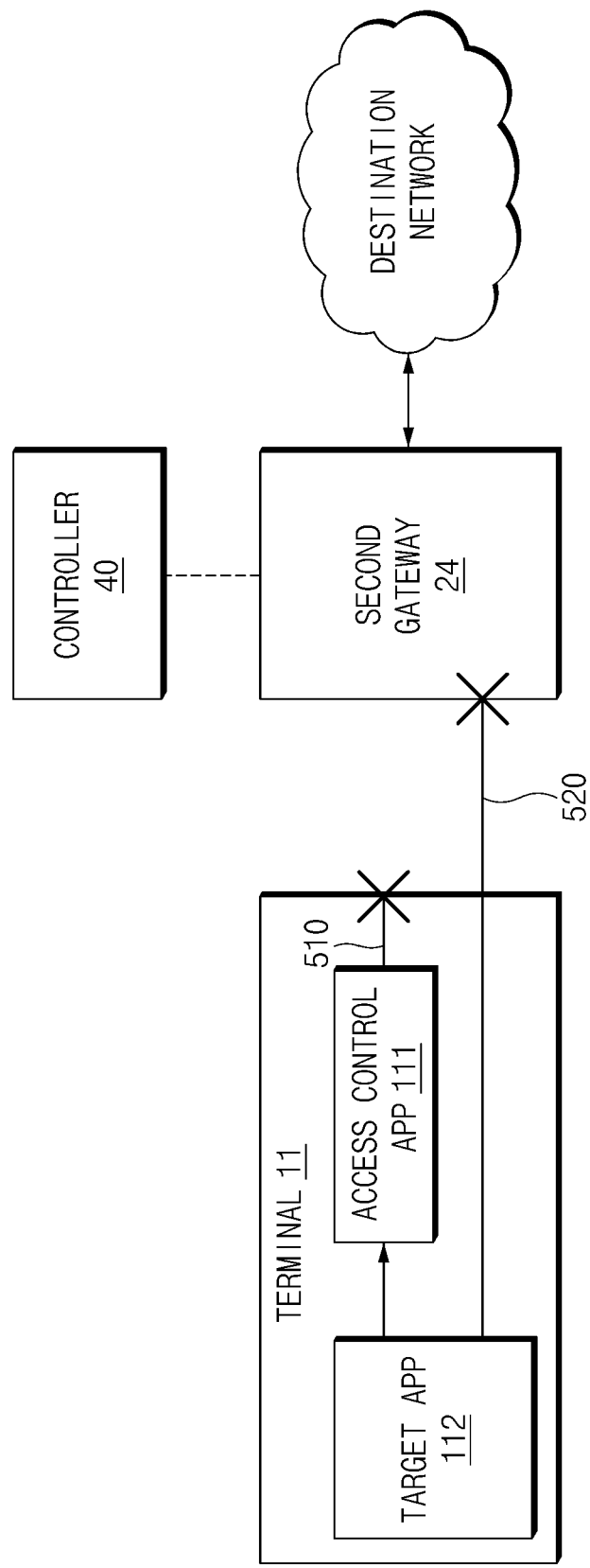
FIG. 5 is a drawing illustrating an operation of a system for controlling network access according to an embodiment of the present disclosure.

FIG. 5 is a drawing illustrating an operation of a system for controlling network access according to an embodiment of the present disclosure.

As shown in FIG. 5, an access control application 111 which operates in a terminal 11 may detect an access request of a target application 112 to a destination network 20 or 30 and may determine whether the terminal 11 or the target application 112 accesses a controller 40. When the terminal 11 or the target application 112 does not access the controller 40, the access control application 111 may block transmission of a data packet in a kernel including an operating system or a network driver (operation 510). By means of the access control application 111, the terminal 11 may previously block access of a malicious application on an application layer in an OSI layer.

According to another embodiment, when the access control application 111 is not installed in the terminal 11 or when the malicious application bypasses control of the access control application 111, an unauthorized data packet may be transmitted from the terminal 11. In this case, because a first gateway 24 and a second gateway 34 which are present on a boundary of a network block a data packet received through an unauthorized tunnel (operation 520), a data packet transmitted from the terminal 11 (e.g., a data packet for generating a TCP session) may fail to arrive at a destination network 20 or 30. In other words, the terminal 11 may be separated from the destination network 20 or 30.

Figure 6:
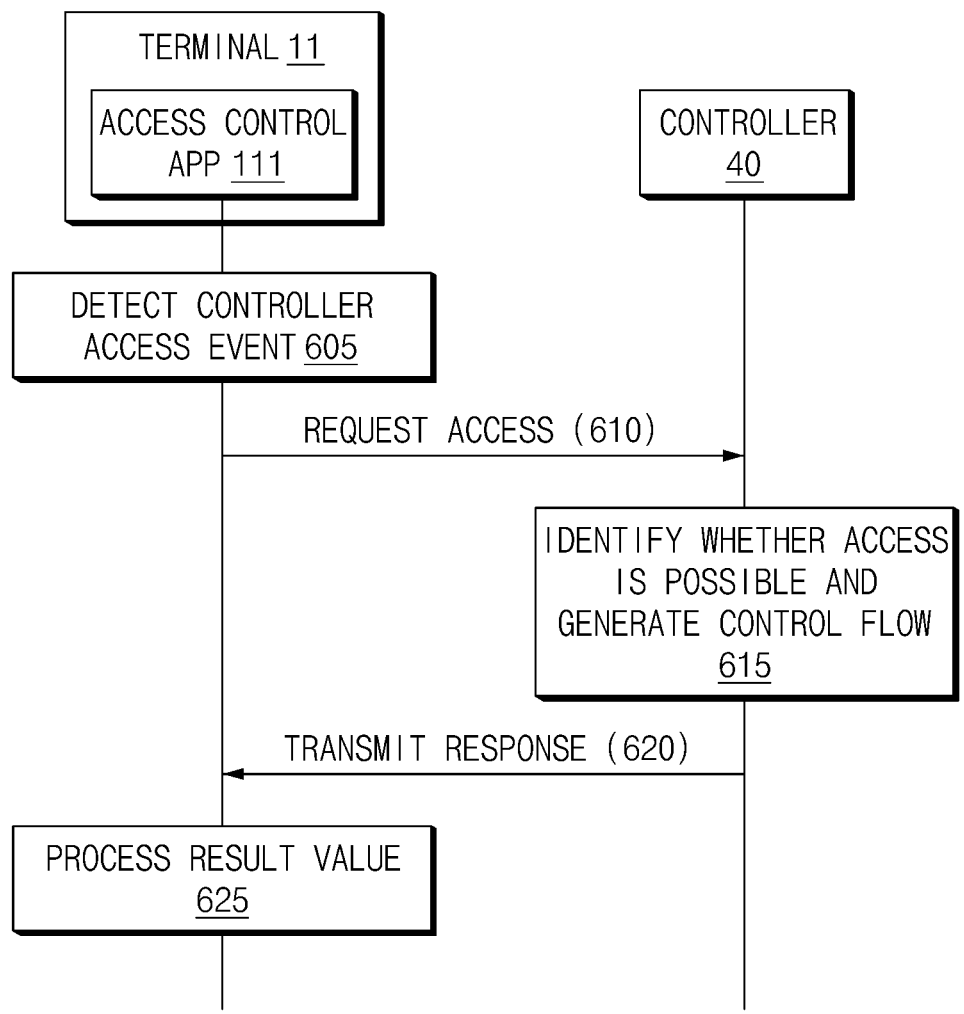
FIG. 6 is a signal sequence diagram illustrating a process where a terminal accesses a controller in a system for controlling network access according to an embodiment of the present disclosure.

FIG. 6 is a signal sequence diagram illustrating a process where a terminal accesses a controller in a system for controlling network access according to an embodiment of the present disclosure.

For a terminal 11 to access a destination network 20 or 30, because there is a need to be authorized by a controller 40, an access control application 111 of the terminal 11 may attempt to access the controller 40 by requesting the controller 40 to generate control flow.

In operation 605, the terminal 11 may detect a controller access event. For example, the access control application 111 is installed and run in the terminal 11, and the terminal 11 may detect that access to the controller 40 is requested by means of the access control application 111.

Figure 7:
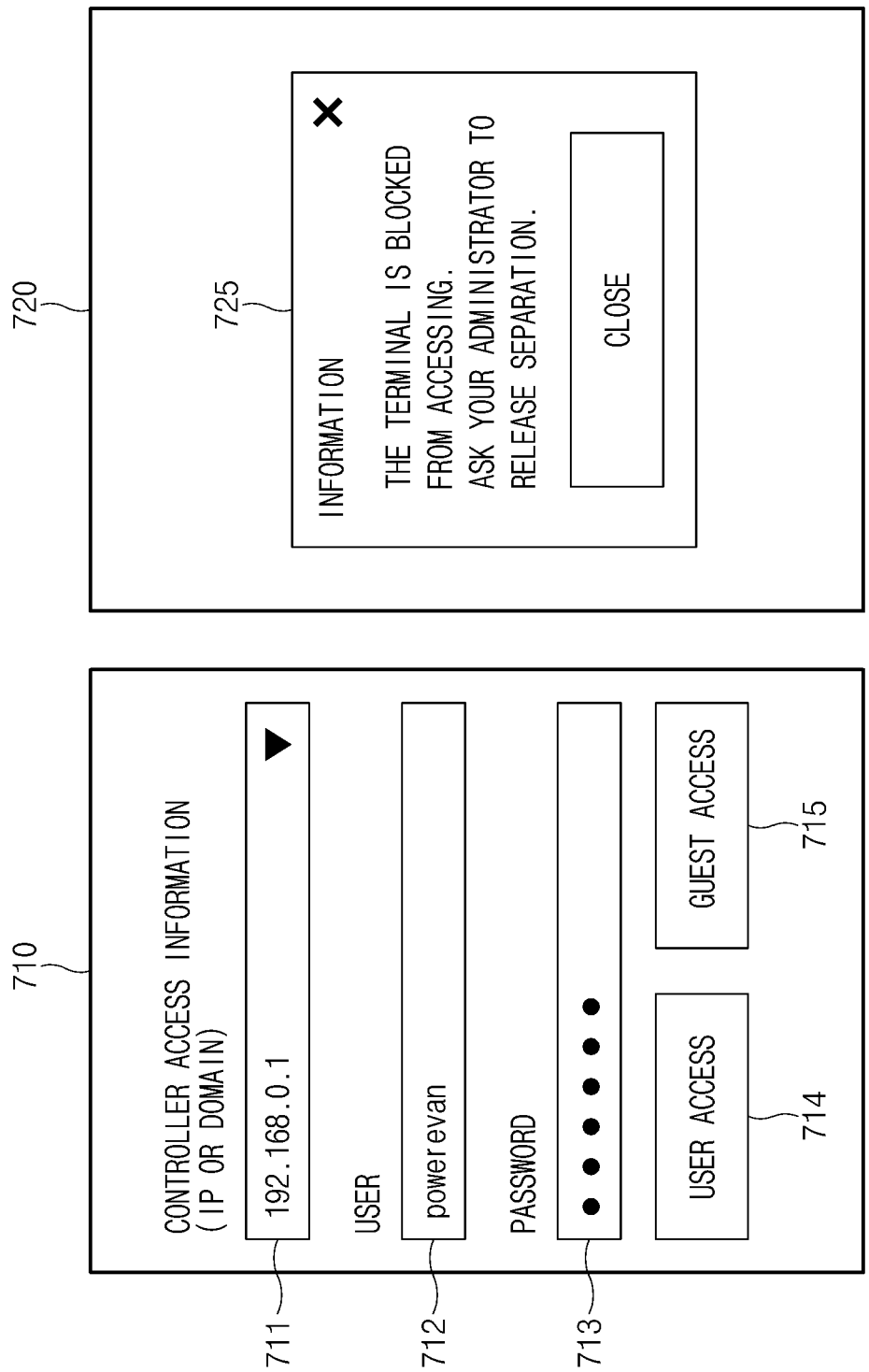
FIG. 7 is a drawing illustrating a user interface screen where a terminal accesses a controller in a system for controlling network access according to an embodiment of the present disclosure.

As an example, referring to FIG. 7, when the access control application 111 is run, the terminal 11 may display a user interface screen 710 for receiving information necessary for access to the controller 40. The user interface screen 710 may include an input window 711 for inputting an IP or a domain of the controller 40, an input window 712 for inputting a user ID, and/or an input window 713 for inputting a password. By receiving a button 714 where an authenticated user accesses the controller after pieces of information about the input windows 711 to 713 are input, the terminal 11 may detect a controller access event. As another example, when the user authentication of the terminal 11 is not completed yet, the terminal 11 may detect the controller access event by receiving a button 715 where an unauthorized user (i.e., a guest) accesses the controller.

In operation 610, the terminal 11 may request controller access from the controller 40 in response to detecting the controller access event. The terminal 11 may request the controller access by means of the access control application 111. According to an embodiment, the access control application 111 may transmit identification information (e.g., a terminal ID, an IP address, or a MAC address) of the terminal 11, a type of the terminal 11, a location of the terminal 11, an environment of the terminal 11, identification information of a network to which the terminal 11 belongs, and/or identification information of the access control application 111.

In operation 615, the controller 40 may identify whether access of the terminal 11 is possible in response to the received request. According to an embodiment, the controller 40 may identify whether the access of the terminal 11 is possible based on a database included in a memory 330. For example, the controller 40 may identify whether the access of the terminal 11 is possible based on whether information received from the access control application 111 is included in an access policy database 311 and/or whether the identification information of the terminal 11 and/or the network to which the terminal 11 belongs is included in a blacklist database 314.

When the access of the terminal 11 is possible, the controller 40 may generate control flow between the terminal 11 and the controller 40. In this case, the controller 40 may generate control flow identification information in the form of a random number and may store the identification information of the terminal 11 and/or the network to which the terminal 11 belongs in a control flow table. Information (e.g., control flow identification information and/or control flow information) stored in the control flow table 315 may be used to authenticate a user of the terminal 11, update information of the terminal 11, identify a policy for network access of the terminal 11, and/or check validity.

When the control flow is generated, in operation 620, the controller 40 may transmit a response to the controller access request to the terminal 11. In this case, the controller 40 may transmit the generated control flow identification information to the terminal 11.

In operation 625, the terminal 11 may process a result value depending on the received response. For example, the access control application 111 may store the received control flow identification information and may display a user interface screen indicating that the controller access is completed to a user. When the controller access is completed, a network access request of the terminal 11 for a destination network may be controlled by the controller 40.

According to another embodiment, the controller 40 may determine that access of the terminal 11 is impossible. For example, when the identification information of the terminal 11 and/or the network to which the terminal 11 belongs is included in the blacklist database, the controller 40 may determine that the access of the terminal 11 is impossible. In this case, the controller 40 may fail to generate control flow in operation 615 and may transmit a response indicating that the access of the terminal 11 is impossible in operation 620.

When receiving the response indicating that the access of the terminal 11 is impossible, in operation 625, the terminal 11 may output a user interface screen indicating that controller access is impossible to the user. For example, referring to FIG. 7, the terminal 11 may display a user interface screen 720 by means of the access control application 111. The user interface screen 720 may indicate that access of the terminal 11 is blocked and may include a user interface 725 guiding a manager (e.g., the controller 40) to release separation.

Figure 8:
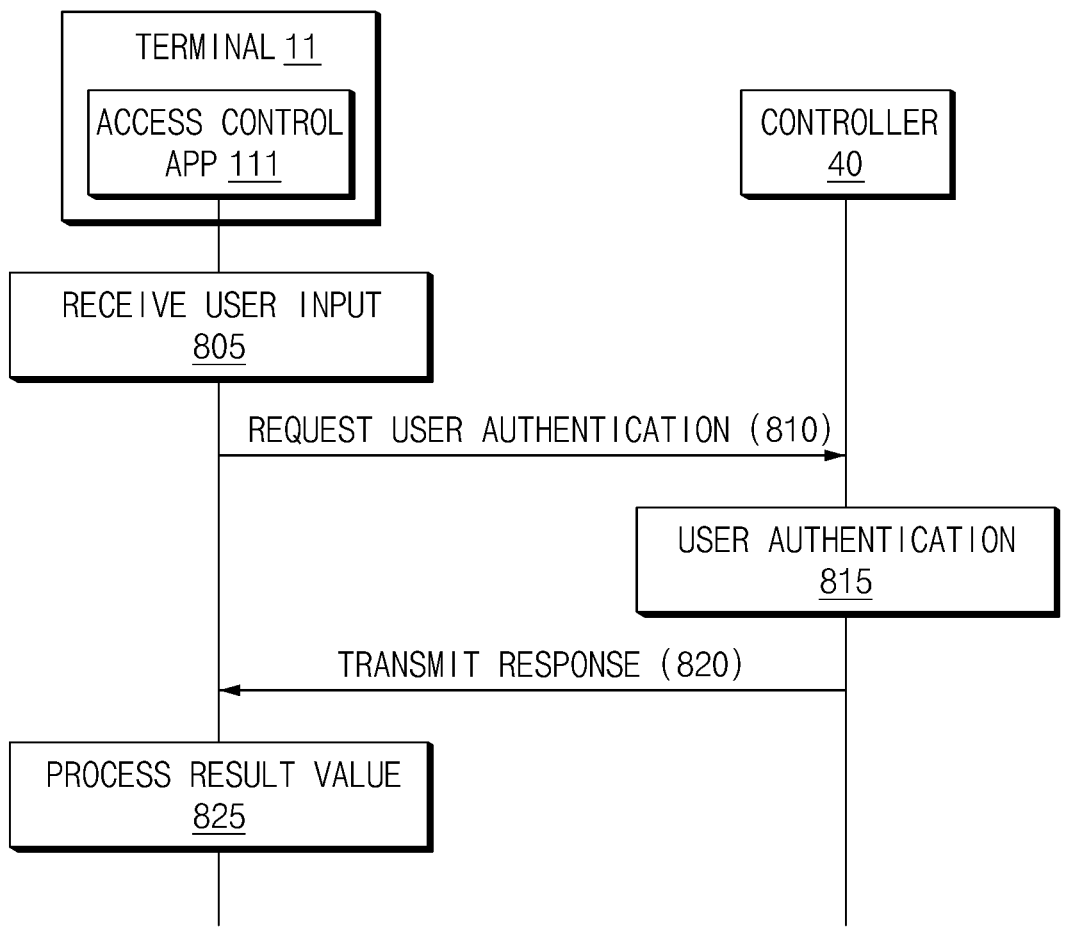
FIG. 8 is a signal sequence diagram illustrating a user authentication process in a system for controlling network access according to an embodiment of the present disclosure.

FIG. 8 is a signal sequence diagram illustrating a user authentication process in a system for controlling network access according to an embodiment of the present disclosure.

For a terminal 11 to obtain detailed access right for a destination network 20 or 30, an access control application 111 of the terminal 11 may receive authentication for a user of the terminal 11 from a controller 40.

In operation 805, the terminal 11 may receive an input for user authentication. The input for the user authentication may be, for example, a user input inputting a user ID and a password. For another example, the input for the user authentication may be a user input (e.g., biometric information) for more reinforced authentication.

In operation 810, the terminal 11 may request user authentication from the controller 40. For example, the access control application 111 may transmit input information for user authentication to the controller 40. When control flow between the terminal 11 and the controller 40 is generated in advance, the access control application 111 may transmit the input information for user authentication together with control flow identification information.

In operation 815, the controller 40 may authenticate a user based on information received from the terminal 11. For example, the controller 40 may determine whether the user is accessible depending on an access policy and whether the user is included in a blacklist based on a user ID, a password, and/or reinforced authentication information, which are included in the received information, and a database (e.g., an access policy database 311 or a blacklist database 314 of FIG. 3) included in a memory of the controller 40.

When the user is authenticated, the controller 40 may add identification information (e.g., a user ID) of the user to identification information of control flow. The added user identification information may be used for controller access or network access of the authenticated user.

In operation 820, the controller 40 may transmit information indicating that the user is authenticated as a response to the user authentication request to the terminal 11.

In operation 825, the terminal 11 may process a result value for the user authentication. For example, the terminal 11 may display a user interface screen indicating that the user authentication is completed to the user.

According to another embodiment, the controller 40 may determine that the user authentication is impossible. For example, when the identification information of the user is included in the blacklist database 314, the controller 40 may determine that the user authentication is impossible. In this case, in operation 820, the controller 40 may transmit information indicating that the user authentication is impossible to the terminal 11. In operation 825, the terminal 11 may display a user interface screen indicating that the user authentication fails.

Figure 9:
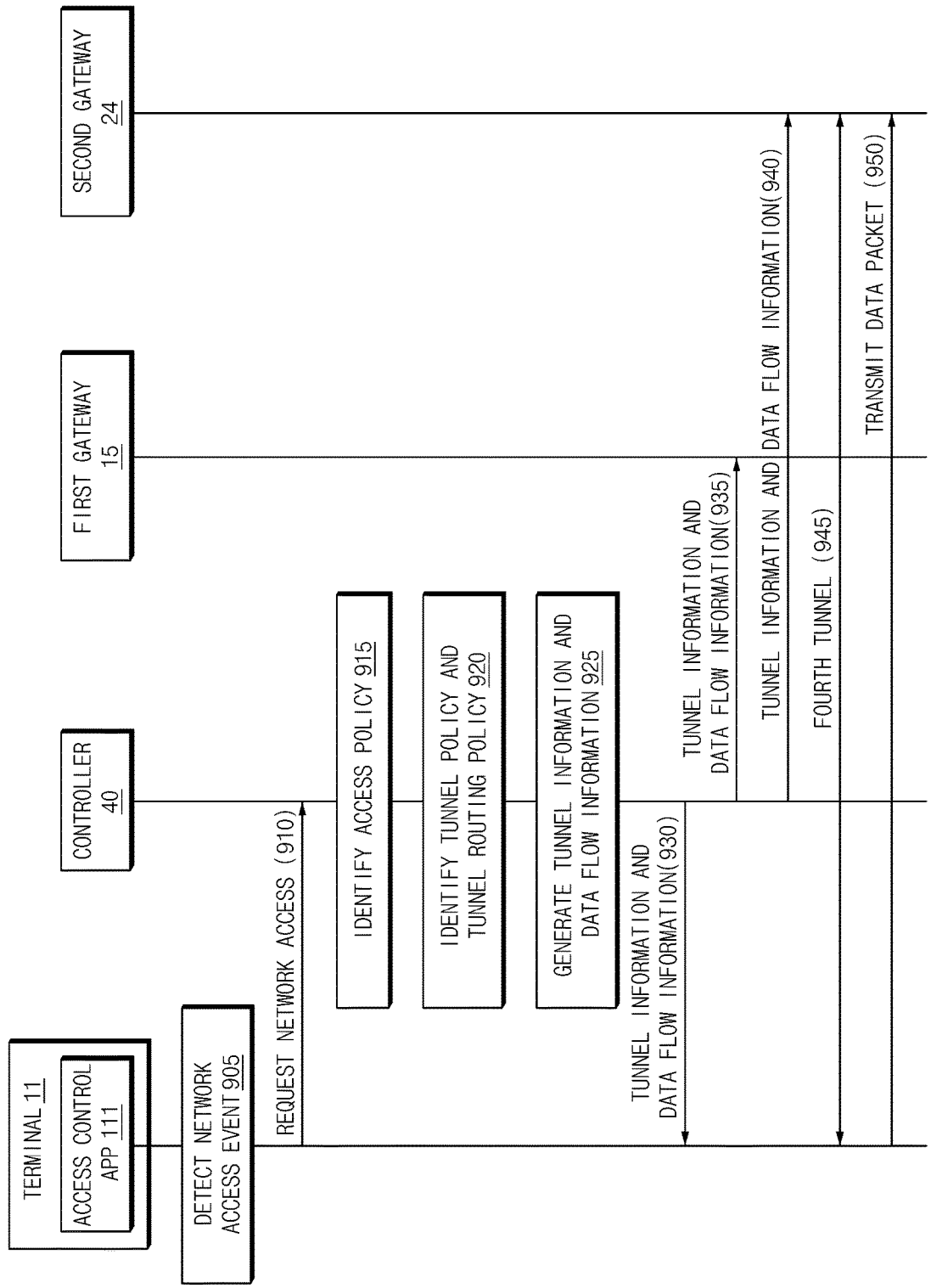
FIG. 9 is a signal sequence diagram illustrating a process of controlling network access of a terminal in a system for controlling network access according to an embodiment of the present disclosure.

FIG. 9 is a signal sequence diagram illustrating a process of controlling network access of a terminal in a system for controlling network access according to an embodiment of the present disclosure and illustrates, for example, a process where a terminal 11 accesses a second network 20 including a second gateway 24 through a first network 10 including a first gateway 15. However, a process where the terminal 11 accesses a third network 30 including a third gateway 34 through the first network 10 including the first gateway 15 may also be the same as the process. The terminal 11 may access a destination network through a plurality of networks irrespective of the number of gateways in such a manner.

The terminal 11 authorized from a controller 40 may control network access of other applications (e.g., a target application 112) stored in the terminal 11 by means of an access control application 111 to ensure trusted data transmission.

In operation 905, the access control application 111 may detect a network access event. For example, the access control application 111 may detect that the target application 112 such as a web browser attempts to access a destination network such as the Internet. For example, a user may run the web browser and may input and call a web address to be accessed.

In operation 910, the access control application 111 may request network access of the target application 112 from the controller 40. In this case, the access control application 111 may transmit identification information of the target application 112, an IP of an access target, and service port information together with identification information of control flow generated between the terminal 11 and the controller 40 to the controller 40.

In operation 915, the controller 40 may identify an access policy based on the request received from the access control application 111. For example, the controller 40 may determine whether access of the target application 112 is possible based on whether the information received from the access control application 111 meets the access policy of the controller 40. When the access of the target application 112 is impossible, the controller 40 may transmit information indicating the access is impossible to the terminal 11. In this case, the access control application 111 may drop a data packet of the target application 112 and may display a user interface screen indicating that access to a network is impossible.

In operation 920, when the access of the target application 112 is possible, the controller 40 may identify a tunnel policy and a tunnel routing policy. For example, the controller 40 may identify a type and a scheme of a tunnel between gateways which are present on a communication path, a type and a scheme of a tunnel between the gateway and a destination node, a type and a scheme of a tunnel between a terminal and the gateway, and a series of tunnel routing paths for tunnels respectively connected from the terminal to gateways or nodes of a destination network based on the tunnel policy and the tunnel routing policy and may identify whether there is a valid tunnel on each path in a tunnel table.

Figure 11:
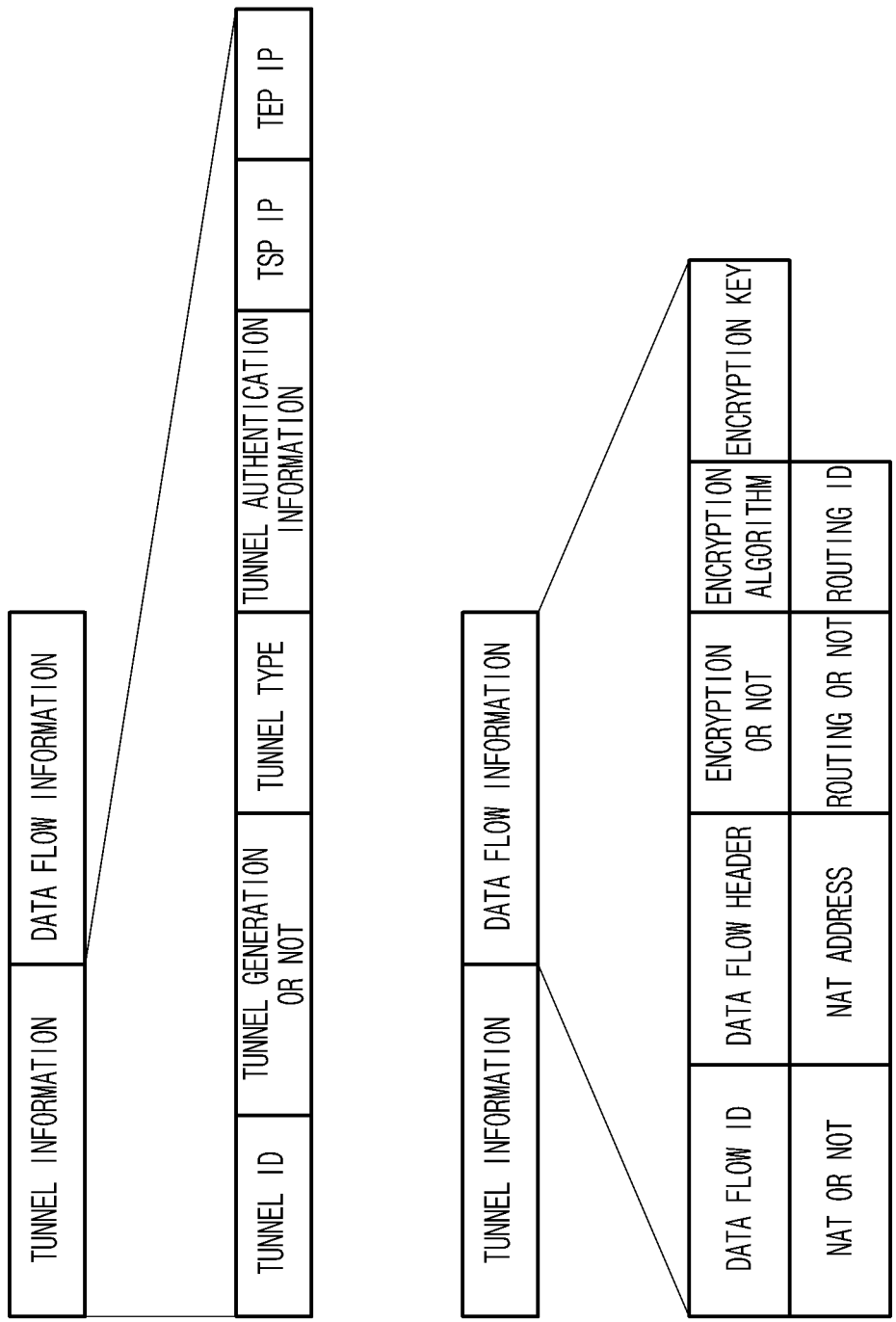
FIG. 11 is a drawing illustrating tunnel information and data flow information generated by a controller of a system for controlling network access according to an embodiment of the present disclosure.

In operation 925, when there is the valid tunnel in each section from a source (the terminal 11) to a destination, the controller 40 may generate and transmit tunnel information and data flow information necessary to use the valid tunnel to the terminal 11 (930). For example, the tunnel information and the data flow information are shown in FIG. 11. The controller 40 may transmit the tunnel information and/or the data flow information to the respective gateways 15 and 24 which are present on a communication path (935 and 940). At this time, because tasks which should be processed by respective nodes (the terminal and respective gateways) are different from each other, each of pieces of data flow information may include pieces of information necessary for the task processed by the corresponding node. In other words, the data flow information optimized for the corresponding node may be transmitted to the corresponding node. For example, there may be a need for information used for the terminal 11 to manipulate (insert a header and encrypt) a data packet and there may be a need for information used for each gateway to manipulate (check a header and forward, route or decrypt and remove the header, or receive) a data packet.

In operation 925, when there is no valid tunnel in each section from the source (the terminal 11) to the destination, the controller 40 may generate information (e.g., a tunnel type, a scheme, authentication information, and/or an IP or a port of a TEP) necessary to generate a tunnel and information included in a data flow table and may transmit the generated information to the first gateway 15, the second gateway 24, and the terminal 11. At this time, likewise, the data flow information optimized for the corresponding node may be transmitted to the corresponding node. When there is no tunnel policy for generating a new tunnel or when the new tunnel is not generated, the controller 40 may notify the terminal 11 that network access is impossible. In this case, the access control application 211 may drop a data packet of the target application 221 and may display a user interface screen indicating that the network access is impossible.

Figure 10A:
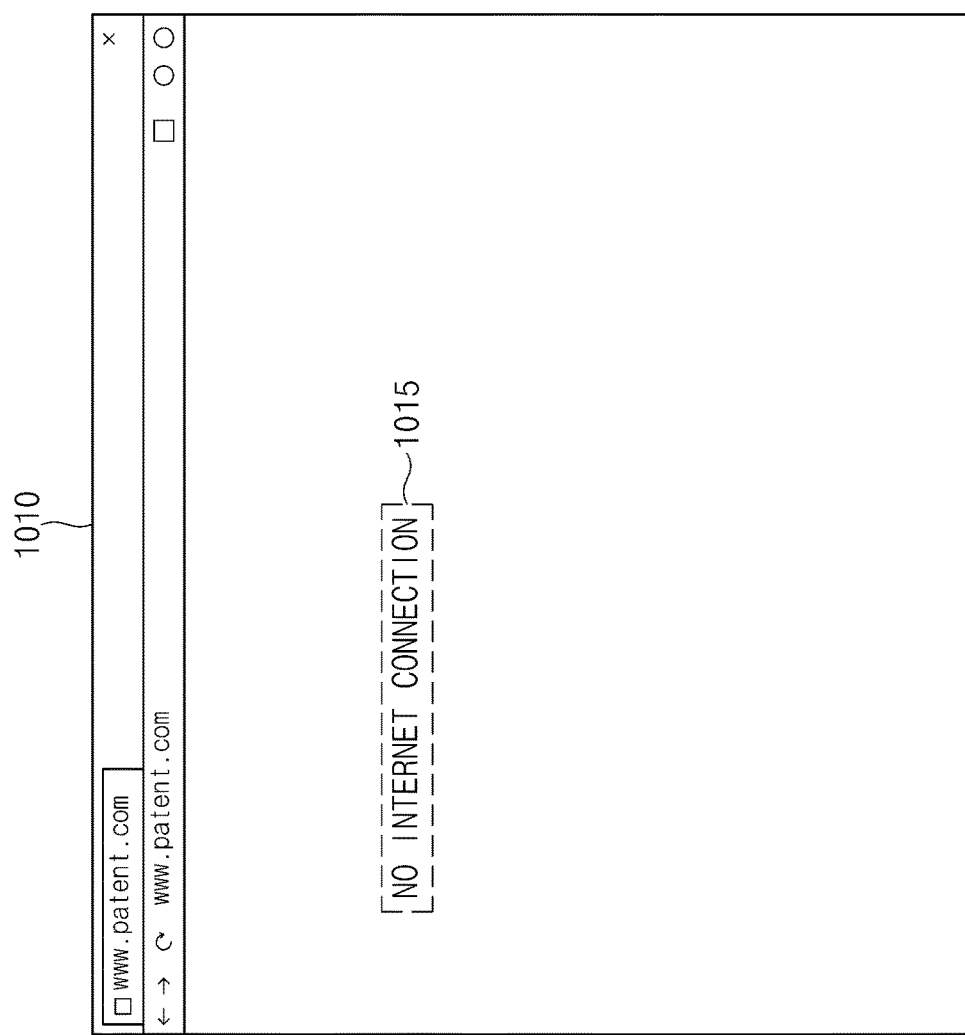
FIG. 10A is a drawing illustrating a user interface screen provided when blocking network access of a terminal in a system for controlling network access according to an embodiment of the present disclosure.

The access control application 111 may process a result value depending to a response of the controller 40. When receiving the information that the network access of the target application is impossible or the information that there is no authorized tunnel, the access control application 111 may drop a data packet and may output a user interface screen indicating that the network access is impossible. For example, referring to FIG. 10A, the terminal 11 may output a user interface screen 1010 or 1020 indicating that access to the destination network is blocked on a display 440. The user interface screen 1010 or 1020 may include text 1015 or a pop-up window 1025 indicating that the access is blocked.

Figure 10B:
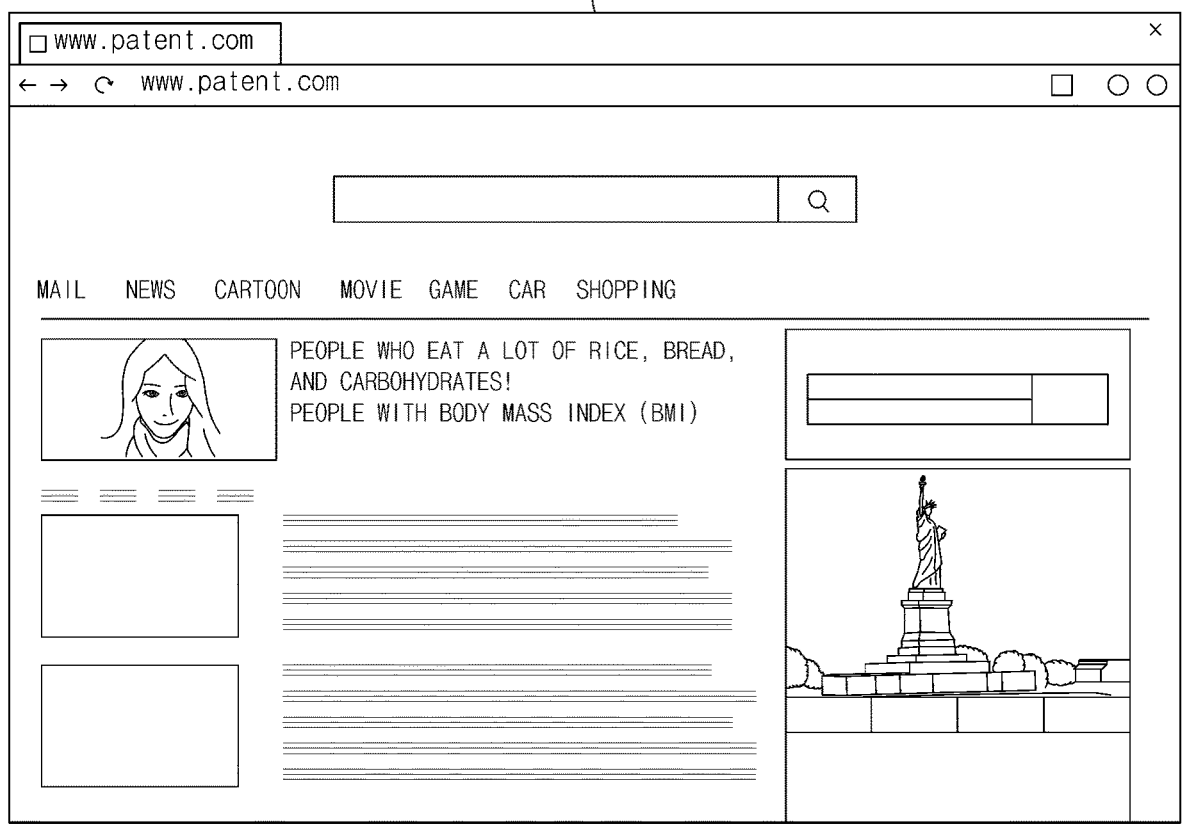
FIG. 10B is a drawing illustrating a user interface screen provided when granting network access of a terminal in a system for controlling network access according to an embodiment of the present disclosure.

When the tunnel information and the data flow information are transmitted to the terminal 11 and the respective gateways 15 and 24, in operation 945, a fourth tunnel 210 may be generated between the terminal 11 and the second gateway 24. A data packet of the target application 112 may be transmitted through the tunnel generated in operation 945 (950). In this case, the access control application 111 may receive a data packet from the destination network and may process data provided from the destination network. For example, referring to FIG. 10B, the terminal 201 may output a screen 1030 provided from a destination network (e.g., a web site), access of which is granted, on its display.

The access control application 111 may first identify whether there is an authorized tunnel between the target application 112 and the second gateway 24 before performing operation 910. For example, the access control application 111 may identify identification information of the target application 112, identification information and service port information of the second network 20, and authentication information (e.g., header information of data flow) and may identify whether there is a tunnel corresponding to the identified information in a data flow table stored in a memory of the terminal 11. When there is an authorized tunnel, the access control application 111 may fail to request network access. When there is no authorized tunnel, in operation 910, the access control application 111 may request the network access.

To ensure integrity and stability of the target application, the access control application 111 may further check validity of the target application before requesting the network access. For example, the access control application 111 may perform whether the target application 112 is forged or falsified, code signing check, and/or fingerprint check. For another example, the access control application 111 may identify whether the target application 112, an access target IP, and a service port are accessible based on an access policy database 311 received from the controller 40. When it fails in checking the validity of the target application 112, the access control application 111 may drop a data packet without requesting the network access. In this case, the access control application 111 may display a user interface screen indicating that the access is impossible. When it succeeds in checking the validity of the target application 112, in operation 910, the access control application 111 may request network access.

FIG. 11 is a drawing illustrating tunnel information and data flow information generated by a controller of a system for controlling network access according to an embodiment of the present disclosure.

As shown in FIG. 11, the tunnel information may have a field in which a tunnel ID, whether a tunnel is generated, a tunnel type, tunnel authentication information, a TSP IP, and a TEP IP are recorded. The data flow information may have a field in which a data flow ID, a data flow header, whether encryption is performed, an encryption algorithm, an encryption key, whether NAT is performed, an NAT address, and a routing tunnel ID are recorded.

When the data flow information is transmitted to a terminal 11, whether the encryption is performed, the encryption algorithm, and the encryption key are included. When the data flow information is transmitted to a destination gateway 24, whether decryption is performed, a decryption algorithm, and a decryption key may be included rather than whether the encryption is performed, the encryption algorithm, and the encryption key.

Figure 12:
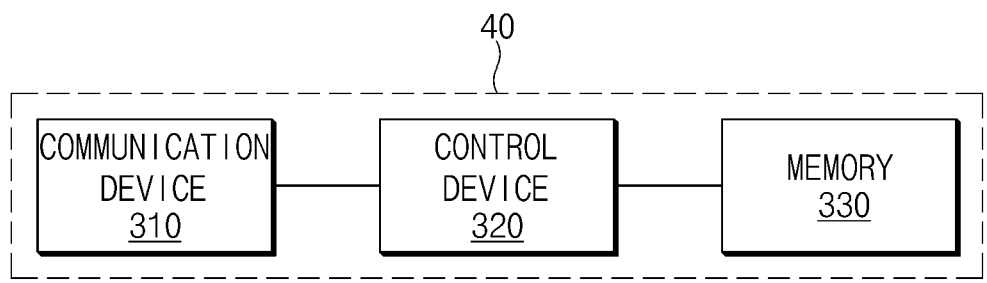
FIG. 12 is a drawing illustrating a configuration of a controller of a system for controlling network access according to an embodiment of the present disclosure.

FIG. 12 is a drawing illustrating a configuration of a controller of a system for controlling network access according to an embodiment of the present disclosure.

As shown in FIG. 12, a controller (an apparatus for controlling network access) according to an embodiment of the present disclosure may include a communication device 310, a control device 320, a memory 330, and the like.

As described in detail in FIG. 3, the memory 330 may store various pieces of information used to generate tunnel information and data flow information to be transmitted to each of a terminal 11, a first gateway 15, and a second gateway 24.

The communication device 310 may provide an interface for communicating with the first gateway 15, the second gateway 24, or a third gateway 34.

The control device 320 may perform the overall control such that respective components may normally perform their own functions. Such a control device 320 may be implemented in the form of hardware, may be implemented in the form of software, or may be implemented in the form of a combination thereof. Preferably, the control device 320 may be implemented as, but not limited to, a microprocessor.

The control device 320 may generate tunnel information and data flow information based on a tunnel policy database 312 and a tunnel routing policy database 318, which are stored in the memory 330, depending on a network access request from the terminal 11.

The control device 320 may identify a routing path of each tunnel located on a communication path from a source terminal to a destination gateway or a destination node, based on the tunnel policy database 312 and the tunnel routing policy database 318, and may identify whether an available tunnel is present based on a tunnel table 316.

When the available tunnel is present in each section from the terminal 11 to the destination gateway 24, the control device 320 may generate and transmit tunnel information and data flow information to each of the terminal 11 and the respective gateways 15 and 24. For example, the tunnel information and the data flow information transmitted to the terminal 11 may include information (header insertion, encryption, and the like) necessary for the terminal 11 to transmit a data packet to the first gateway 15, the tunnel information and the data flow information transmitted to the first gateway 15 may include information (header check and forwarding, routing, decryption, header removal, reception, or the like) necessary for the first gateway 15 to transmit a data packet to the second gateway 24, and the tunnel information and the data flow information transmitted to the second gateway 24 may include information (header check and forwarding, routing, decryption, header removal, reception, or the like) necessary to transmit data to a first destination node 23.

When the available tunnel is not present in each section from the terminal 11 to the destination gateway 24, the control device 320 may generate and transmit a series of pieces of information (e.g., a tunnel type, a scheme, authentication information, an IP and a port of the TEP, and the like) necessary to generate a tunnel between the terminal 11 and the destination gateway 24 and the above-mentioned data flow information to each of the terminal 11 and the respective gateways 15 and 24. Likewise, the tunnel information and the data flow information may include information optimized for a corresponding destination.

When the control device 320 is unable to generate a new tunnel in each section from a source to a destination, it may notify the terminal 11 that network access is impossible.

Figure 13:
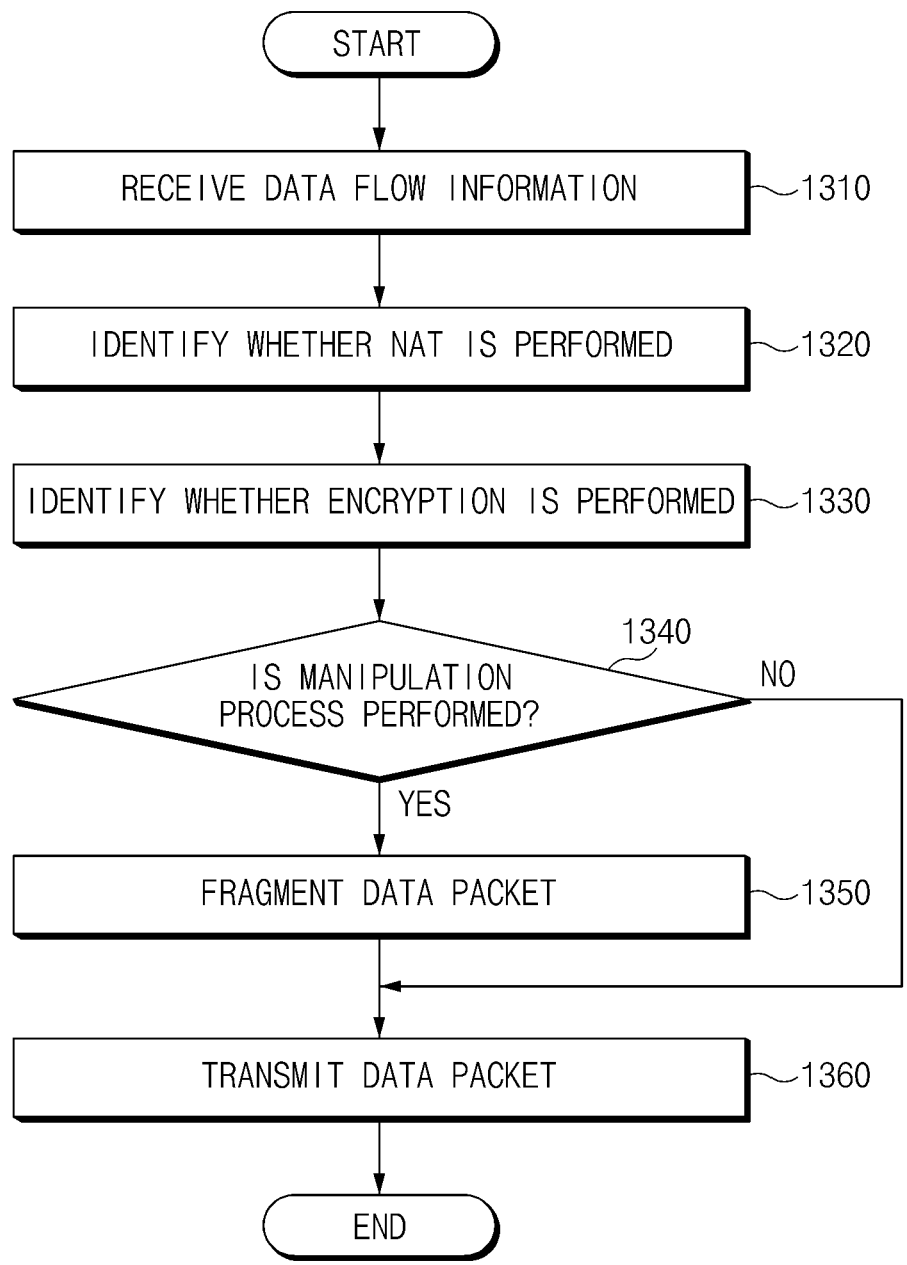
FIG. 13 is a flowchart illustrating a process of transmitting a data packet in a terminal of a system for controlling network access according to an embodiment of the present disclosure.

FIG. 13 is a flowchart illustrating a process of transmitting a data packet in a terminal of a system for controlling network access according to an embodiment of the present disclosure.

An access control application 111 of a terminal 11 may perform a data packet manipulation process based on data flow information transmitted from a controller 40 (1310).

In operation 1320, the access control application 111 may identify whether to replace a destination IP and port information of a data packet by an NAT policy based on the data flow information. At this time, when replacement is needed, the access control application 111 may replace the destination IP and the port information based on an NAT address included in the data flow information.

In operation 1330, the access control application 111 may identify whether the data packet is encrypted based on the data flow information. At this time, when encryption is needed, the access control application 111 may encrypt the data packet based on a type of an encryption algorithm and an encryption key, which are included in the data flow information. The access control application 111 may insert a header into the encrypted data packet to allow each gateway 15 or 24 on a communication path to identify whether there is an authorized data packet using the header and perform routing control. The access control application 111 may insert the header (a data flow header) included in the data flow information into the encrypted data packet.

In operation 1340, the access control application 111 may identify whether any of manipulation processes (NAT and encryption) for the data packet is performed. When any of the manipulation processes is performed, the data packet may be fragmented based on a maximum transmit unit (MTU) value (1350).

In operation 1360, the access control application 111 may transmit the data packet. A header may be inserted into a payload or a TCP or IP header option field and the other location of the data packet prior to tunneling. For example, for a data packet passing through multiple boundaries, a tunneling technology may support only encapsulation, and the payload of the data packet may be encrypted by means of an internal encryption algorithm through the above process. Encryption in units of tunneling and encryption and a type in units of data packets may be provided by a method optimized according to an environment and situation of a network depending on a tunnel policy of the controller 40. A structure of the data packet is shown in, for example, FIG. 14.

Figure 14:
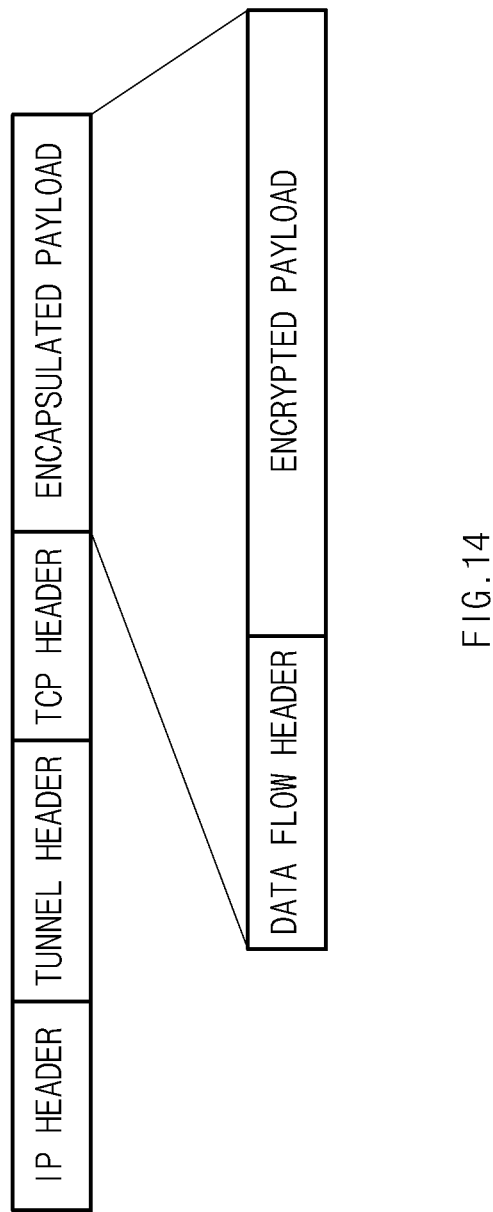
FIG. 14 is a drawing illustrating a structure of a data packet transmitted by a terminal of a system for controlling network access according to an embodiment of the present disclosure.

FIG. 14 is a drawing illustrating a structure of a data packet transmitted by a terminal of a system for controlling network access according to an embodiment of the present disclosure.

As shown in FIG. 14, the data packet transmitted by the terminal of the system for controlling the network access according to an embodiment of the present disclosure may include an IP header, a tunneling header, a TCP header, and an encapsulated payload. The encapsulated payload may include a data flow header and an encrypted payload.

Figure 15:
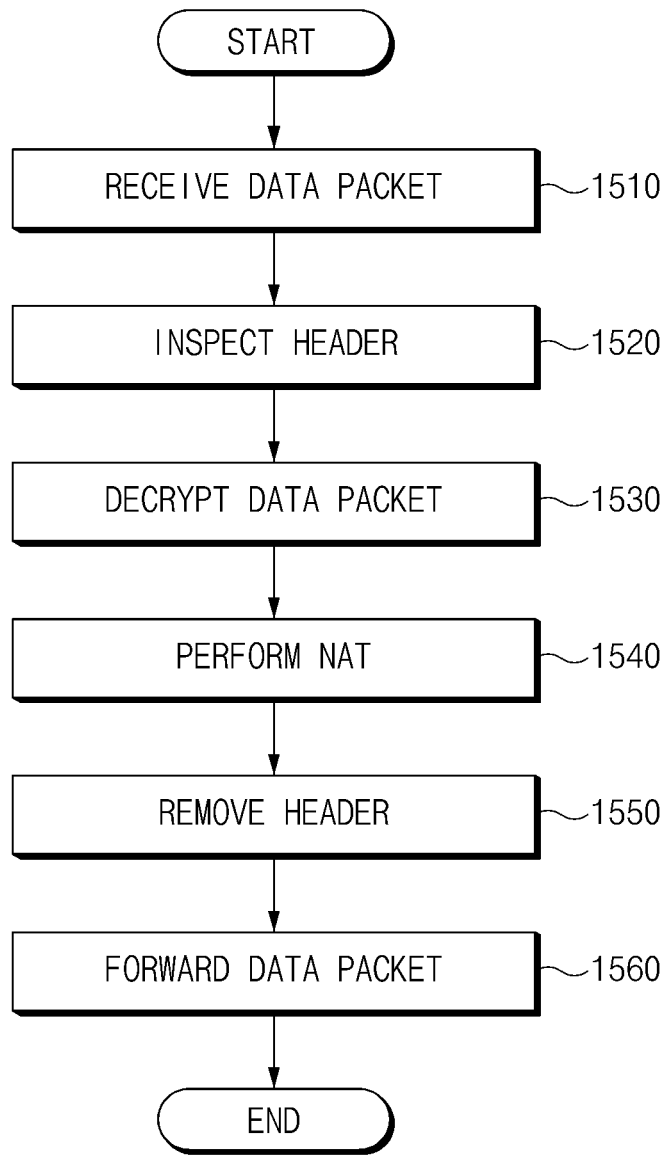
FIG. 15 is a flowchart illustrating a process of forwarding a data packet in a gateway of a system for controlling network access according to an embodiment of the present disclosure.

FIG. 15 is a flowchart illustrating a process of forwarding a data packet in a gateway of a system for controlling network access according to an embodiment of the present disclosure, which illustrates a process where a second gateway 24 forwards a data packet.

The second gateway 24 may receive and store tunnel information and data flow information from a controller 40.

The second gateway 24 may receive a data packet (1510). At this time, the second gateway 24 may identify whether the data packet is received through an authorized tunnel (a fourth tunnel 210) and may drop the data packet, when the data packet is not received through the authorized tunnel.

When the data packet is received through the authorized tunnel, the second gateway 24 may inspect a header of the data packet (1520). For example, the second gateway 24 may identify whether there is a header in the data packet. When there is no header, the second gateway 24 may drop the data packet. When there is the header, the second gateway 24 may identify whether there is data flow corresponding to the header in a data flow table. When there is no data flow corresponding to the header, the data packet may be dropped. When there is the data flow, the data packet may be authorized.

For the authorized data packet, the second gateway 24 may decrypt the data packet based on whether decryption is performed, a decryption algorithm, and a decryption key, which are included in the data flow information (1530). At this time, when it fails in the decryption, the second gateway 24 may drop the data packet.

The second gateway 24 may replace an IP header of the data packet into an NAT address based on whether NAT is performed and the NAT address, which are included in the data flow information.

The second gateway 24 may remove the header of the data packet (1550) and may process reception.

When the first gateway 15 performs the processes of FIG. 15, the processes of 1510 to 1550 may be performed in the same manner and it may further perform a process (1560) of routing the data packet to a next destination.

As another example, the first gateway 15 may determine whether a header of data flow is present in the data packet received from the terminal 11, without performing the processes of FIG. 15. When the header of the data flow is present, the first gateway 15 may forward the data packet to the second gateway 15. When the header of the data flow is not present, the first gateway 15 may drop the data packet.

Figure 16:
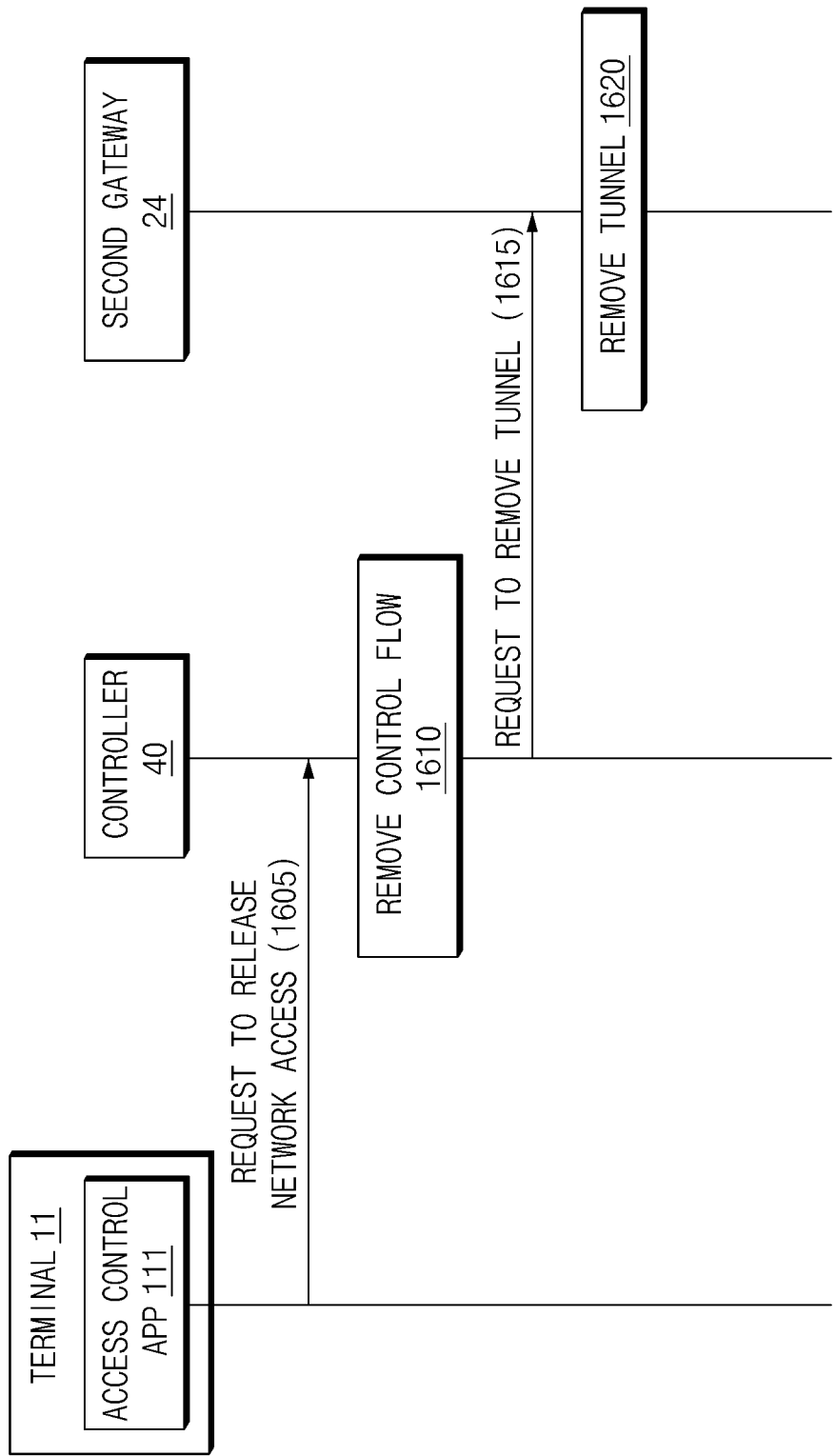
FIG. 16 is a signal sequence diagram illustrating a process of releasing network access of a terminal in a system for controlling network access according to an embodiment of the present disclosure.

FIG. 16 is a signal sequence diagram illustrating a process of releasing network access of a terminal in a system for controlling network access according to an embodiment of the present disclosure.

In operation 1605, a terminal 11 may request a controller 40 to release network access. For example, the terminal 11 may transmit identification information of control flow between the terminal 11 and a controller 40 together with information requesting to release the network access to the controller 40.

Figure 17:
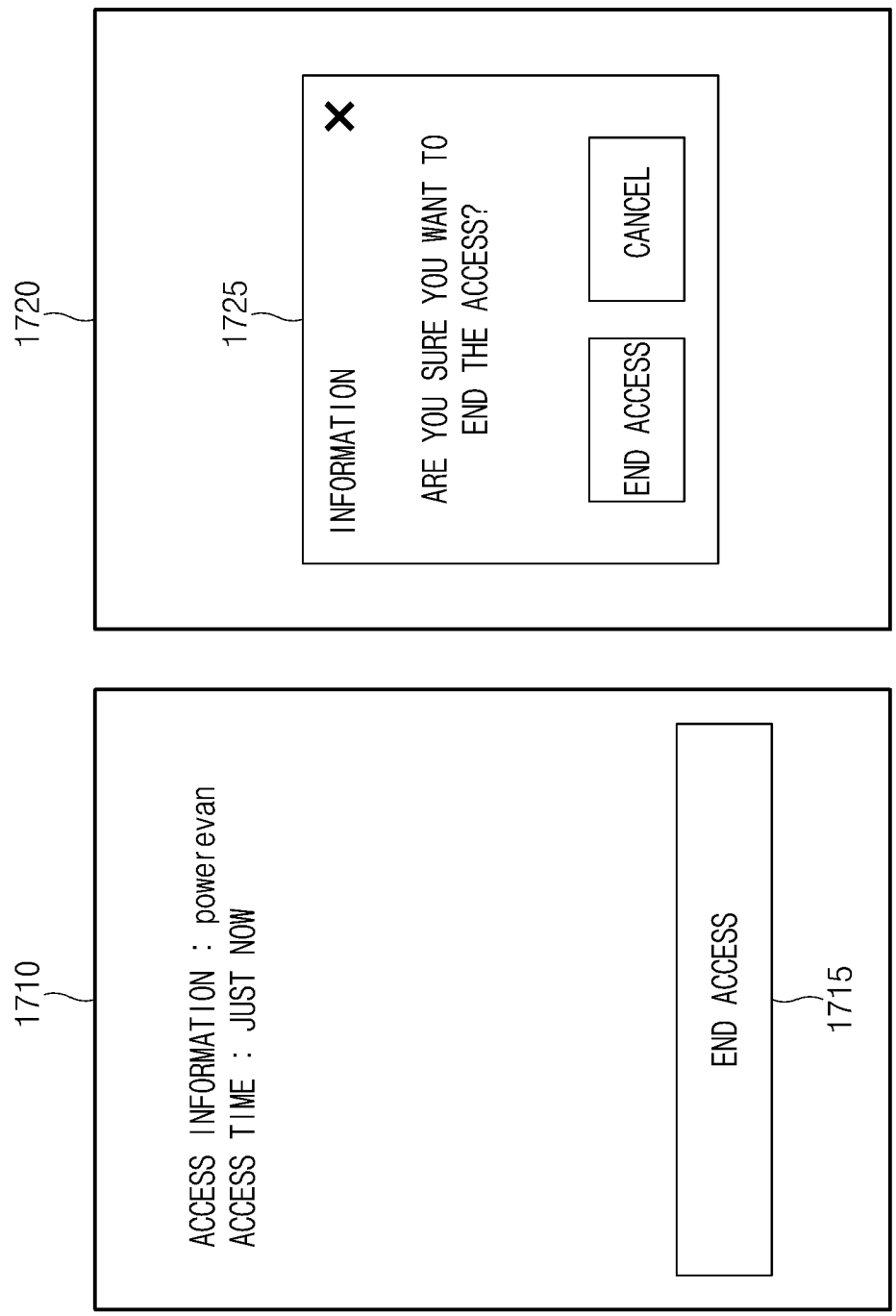
FIG. 17 is a drawing illustrating a user interface screen provided in a process of releasing network access of a terminal in a system for controlling network access according to an embodiment of the present disclosure.

According to an embodiment, the terminal 11 may attempt to release the network access in response to a network access release event such as a request of a user, restart of the terminal 11, or a request of an access control application 111. For example, referring to FIG. 17, the terminal 11 may receive a user input selecting an access end button 1715 on a user interface screen 1710 output on its display. The terminal 11 may output a user interface screen 1720 including a pop-up window 1725 to identify access end again from the user. For another example, the terminal 11 may immediately perform operation 1605 without outputting the user interface screen 1720.

In operation 1610, the controller 40 may remove (or release) control flow corresponding to the received identification information in response to the request of the terminal 11.

In operation 1615, the controller 40 may request a second gateway 24 or/and a first gateway 15 to remove a tunnel dependent on the removed control flow. The tunnel dependent on the removed control flow may be plural in number. In this case, the controller 40 may request to remove all tunnels dependent on the removed control flow.

In operation 1620, the second gateway 24 may remove a tunnel in response to the request of the controller 40. When the tunnel is removed, a data packet transmitted to a destination network corresponding to the controlled tunnel may be blocked by the access control application 111 or the second gateway 24. Through the above-mentioned operation, a system including the terminal 11 may release the authorized tunnel if necessary to provide perfect blocking and separation of the terminal 11 from the network.

The invention claimed is:

1. An apparatus for controlling network access, the apparatus comprising:
a memory storing a tunnel policy, a tunnel routing policy, and a tunnel table; and
a control device configured to:
generate tunnel information and data flow information based on the tunnel policy, the tunnel routing policy, and the tunnel table depending on a network access request of a terminal,
transmit the generated tunnel information and the generated data flow information to the terminal and a gateway of each network such that a tunnel between the terminal and a destination network is generated,
identify an access policy based on the network access request of the terminal, and
generates and transmits the tunnel information and the data flow information to the terminal and the gateway of each network, when an available tunnel is present in each section from the terminal to the destination network,
wherein the control device generates the data flow information based on information of the destination network and an application ID of the terminal or the information of the destination network and an ID of the terminal,
wherein the generated tunnel information comprises tunnel id, tunnel type, or tunnel authentication information, or any combination thereof,
wherein the generated data flow information transmitted to the terminal comprises information indicating that encryption is performed, an encryption algorithm, and an encryption key,
wherein the generated data flow information includes a network address translation (NAT) address that replaces a destination IP and port information in a data packet,
wherein the data packet is encrypted into an encrypted data packet based on a type of an encryption algorithm and the encryption key included in the data flow information,
wherein a header included in the data flow information is inserted into the encrypted data packet, and
wherein the data packet into which the header is inserted is fragmented based on a maximum transmit unit (MTU) value and transmitted to the destination network.

2. The apparatus of claim 1, wherein the control device identifies a routing path of each tunnel located on a communication path from the terminal to the destination network based on the tunnel policy and the tunnel routing policy and identifies whether an available tunnel is present based on the tunnel table.

3. The apparatus of claim 1, wherein the control device transmits information necessary to generate a tunnel together with the generated tunnel information and the generated data flow information to the terminal and the gateway of each network, when an available tunnel is present in each section from the terminal to the destination network.

4. The apparatus of claim 1, wherein the control device transmits the data flow information including whether network address translation (NAT) is performed and an NAT address to the terminal.

5. The apparatus of claim 1, wherein the control device transmits the data flow information including network address translation (NAT) is performed, an NAT address, a data flow header, whether decryption is performed, a decryption algorithm, a decryption key, whether routing is performed, or a routing tunnel ID to the gateway of each network.

6. A method for controlling network access, the method comprising:
storing a tunnel policy, a tunnel routing policy, and a tunnel table;
generating tunnel information and data flow information based on the tunnel policy, the tunnel routing policy, and the tunnel table depending on a network access request of a terminal;
transmitting the generated tunnel information and the generated data flow information to the terminal and a gateway of each network such that a tunnel between the terminal and a destination network is, generated;
identifying an access policy based on the network access request of the terminal; and
generating and transmitting the tunnel information and the data flow information to the terminal and the gateway of each network, when an available tunnel is present in each section from the terminal to the destination network,
wherein the data flow information is generated based on information of the destination network and an application ID of the terminal or the information of the destination network and an ID of the terminal, wherein the generated tunnel information comprises tunnel id, tunnel type, or tunnel authentication information, or any combination thereof, wherein the generated data flow information transmitted to the terminal comprises information indicating that encryption is performed, an encryption algorithm, and an encryption key, wherein the generated data flow information includes a network address translation (NAT) address that replaces a destination IP and port information in a data packet, wherein the data packet is encrypted into an encrypted data packet based on a type of an encryption algorithm and the encryption key included in the data flow information, wherein a header included in the data flow information is inserted into the encrypted data packet, and wherein the data packet into which the header is inserted is fragmented based on a maximum transmit unit (MTU) value and transmitted to the destination network.

7. The method of claim 6, wherein the generating of the tunnel information and the data flow information includes:
identifying a routing path of each tunnel located on a communication path from the terminal to the destination network based on the tunnel policy and the tunnel routing policy; and
identifying whether an available tunnel is present based on the tunnel table.

8. The method of claim 6, wherein the generating of the tunnel between the terminal and the destination network includes:
transmitting information necessary to generate a tunnel together with the generated tunnel information and the generated data flow information to the terminal and the gateway of each network, when the available tunnel is present in each section from the terminal to the destination network.

9. The method of claim 6, wherein the generating of the data flow information includes:
including whether network address translation (NAT) is performed, an NAT address, whether encryption is performed, an encryption algorithm, or an encryption key in the data flow information transmitted to the terminal.

10. The method of claim 6, wherein the generating of the data flow information includes:
including whether network address translation (NAT) is performed, an NAT address, a data flow header, whether decryption is performed, a decryption algorithm, a decryption key, whether routing is performed, or a routing tunnel ID in the data flow information transmitted to the gateway of each network.

11. A method for controlling network access in a terminal, the method comprising:
receiving data flow information;
performing a manipulation process in a data packet based on the data flow information; and
transmitting the data packet, the manipulation process of which is performed, through a tunnel to a destination network,
wherein the data flow information is generated based on information of the destination network and an application ID of the terminal or the information of the destination network and an ID of the terminal, and
wherein the performing of the manipulation process includes:
replacing a destination IP and port information based on an NAT address included in the data flow information;
encrypting the data packet based on a type of an encryption algorithm and an encryption key included in the data flow information;
inserting a header included in the data flow information into the encrypted data packet; and
fragmenting and transmitting the data packet into which the header is inserted.

12. A method for controlling network access in a gateway, the method comprising:
receiving a data packet from a terminal through an authorized tunnel;
identifying whether the data packet is authorized based on a data flow header included in previously stored data flow information;
decrypting the authorized data packet based on whether decryption is performed, a decryption algorithm, and a decryption key included in the data flow information;
replacing an IP header of the decrypted data packet with a network address translation (NAT) address based on whether NAT is performed and the NAT address included in the data flow information; and
removing the data flow header of the data packet, the header being replaced with the NAT address,
wherein the data flow information is generated based on information of a destination network and an application ID of the terminal or the information of the destination network and an ID of the terminal.

13. The method of claim 12, wherein the identifying of whether the data packet is authorized includes:
determining the data packet as an authorized data packet, when a header is present in the data packet and is identical to a header included in the data flow information.

14. The method of claim 12, further comprising:
receiving and processing the data packet, the header of which is removed, when the gateway is a gateway of the destination network.

15. The method of claim 12, further comprising:
forwarding the data packet, the header of which is removed, to a gateway of the destination network, when the gateway is not the gateway of the destination network.

* * * * *